(12) United States Patent
Naganawa et al.

(10) Patent No.: US 8,809,201 B2
(45) Date of Patent: Aug. 19, 2014

(54) METHOD OF FORMING METAL OXIDE FILM AND METAL OXIDE FILM

(75) Inventors: Satoshi Naganawa, Tokyo (JP); Takeshi Kondo, Tokyo (JP)

(73) Assignee: Lintec Corporation, Tokyo (JP)

( * ) Notice: Subject to any disclaimer, the term of this patent is extended or adjusted under 35 U.S.C. 154(b) by 429 days.

(21) Appl. No.: 13/258,323

(22) PCT Filed: Mar. 23, 2010

(86) PCT No.: PCT/JP2010/054982
§ 371 (c)(1),
(2), (4) Date: Sep. 21, 2011

(87) PCT Pub. No.: WO2010/110264
PCT Pub. Date: Sep. 30, 2010

(65) Prior Publication Data
US 2012/0034423 A1 Feb. 9, 2012

(30) Foreign Application Priority Data

Mar. 26, 2009 (JP) ................................. 2009-077304

(51) Int. Cl.
| | | |
|---|---|---|
| H01L 21/31 | (2006.01) | |
| H01L 21/469 | (2006.01) | |
| C01G 15/00 | (2006.01) | |
| C03C 17/25 | (2006.01) | |
| C01G 9/02 | (2006.01) | |
| C23C 8/02 | (2006.01) | |
| C01G 23/04 | (2006.01) | |
| C01G 9/00 | (2006.01) | |
| C03C 17/27 | (2006.01) | |

(52) U.S. Cl.
CPC ............... *C01G 23/04* (2013.01); *C01G 15/00* (2013.01); *C03C 17/25* (2013.01); *C01G 9/02* (2013.01); *C03C 2217/77* (2013.01); *C23C 8/02* (2013.01); *C01P 2004/03* (2013.01); *C01P 2002/84* (2013.01); *C01G 9/00* (2013.01); *C03C 2218/33* (2013.01); *C03C 17/27* (2013.01); *C01P 2006/42* (2013.01); *C03C 2218/322* (2013.01)
USPC ............ 438/758; 438/760; 438/765; 438/770

(58) Field of Classification Search
None
See application file for complete search history.

(56) References Cited

U.S. PATENT DOCUMENTS 5,827,436 A * 10/1998 Kamide et al. .................. 216/77
2008/0020583 A1 * 1/2008 Ueda et al. .................... 438/717

FOREIGN PATENT DOCUMENTS

| CN | 101093796 | 12/2007 |
| JP | 02-254192 | 10/1990 |

(Continued)

*Primary Examiner* — Duy Deo
(74) *Attorney, Agent, or Firm* — Gerald E Hespos; Michael J Porco; Matthew T Hespos

(57) ABSTRACT

The present invention provides; a method for forming a metal oxide film which has both a surface irregularity and a predetermined pattern or either and has few unevenness of surface specific resistance, light transmittance and the like, and such the metal oxide film.

The method for forming a metal oxide film having both a surface irregularity and a predetermined pattern or either on a substrate, wherein, the method comprises a first process in which a liquid material containing a metal salt is applied on the substrate to form a metal salt film, a second process in which a surface irregularity or a predetermined pattern is formed to the metal salt film, and a third process in which the metal salt film is converted to a metal oxide film by thermal oxidation treatment or plasma oxidation treatment.

14 Claims, 24 Drawing Sheets

(56) References Cited

FOREIGN PATENT DOCUMENTS

| JP | 9-157855 | 6/1997 |
| JP | 2000-327310 | 11/2000 |
| JP | 2001-59175 | 3/2001 |
| JP | 2001-177127 | 6/2001 |
| JP | 2005-310387 | 11/2005 |
| JP | 2008-177549 | 7/2008 |
| JP | 2009-54763 | 3/2009 |

* cited by examiner

METHOD OF FORMING METAL OXIDE FILM AND METAL OXIDE FILM

BACKGROUND OF THE INVENTION

1. Field of the Invention

The present invention relates to a method for forming a metal oxide film having both a surface irregularity and a predetermined pattern or either and the obtained metal oxide film by using such forming method. More particularly, the present invention relates to a method for forming a metal oxide film having a surface irregularity and the like, which is most suitable for the electrodes of electronic devices, and the obtained metal oxide film by using such forming method.

2. Description of the Related Art

Conventionally, a transparent electrode which is composed of a thin film including the metal oxide and which is formed by using a vapor deposition process on a glass substrate (hereinafter, it may be called as a metal oxide film) has been known.

However, a plastic film would be substituted for a glass substrate in view of its light weight and the necessity of a thin type electronic device.

The following formation methods have been known to form a metal film or a metal oxide film on such a plastic film.

(1) the vapor deposition method such as the vacuum deposition process or the sputtering process of metal materials or metal oxide materials.

(2) the coating method for the solution in which metal particles or metal oxide particles are dispersed into an organic binder.

However, the production cost for (1) the vapor deposition method is very high, since it is necessary to maintain the high vacuum condition, and there are problems in mass productivity and economic aspects for the vapor deposition method.

Also, (2) the coating method has the problem that the conductivity of the obtained metal film and the like is inferior to that of the metal film and the like which is obtained by the vapor deposition method.

Accordingly, the sol-gel method using metal alkoxide and its hydrolysate has been proposed as a formation method of the metal oxide film, since the obtained metal oxide film is homogeneous, transparent, and the selection range of materials for such formation method is wide.

Also, the recent study of the composite film (highbred film) which has a homogeneous property and which is composed by an inorganic polymer and an organic polymer has been carried out by further incorporating the other organic materials in order to have the new functions as well as to improve the properties.

However, since the thermal treatment process (sintering process) at a high temperature was necessary, and the continuous manufacturing method was limited, there were problems that the manufacturing cost became high and the substrate was easily heat-degraded while the heat treatment process.

Further, there was the other problem that the kind selection of the substrate was excessively limited to prevent such heat degradation of the substrate.

Therefore, instead of carrying out the thermal treatment process at a high temperature when a metal oxide film is formed by using a sol-gel method, a wavelength irradiation with ultraviolet light at 360 nm or less has been proposed for crystallizing the metal oxide film (e.g., JPH9-157855A).

Also, when a metal oxide film is formed by using a sol-gel method, a method by which a plasma treatment is carried out after forming a metal oxide gel layer on a substrate, has been proposed (e.g., JP200-327310A).

More specifically, it is the method for forming a metal oxide film by applying the predetermined plasma treatment to the metal oxide gel layer, after metal oxide sol obtained from a metal alkoxide or a metal salt as a main material on substrate, was beforehand changed into the metal oxide gel layer.

On the other hand, a transparent electrode substrate for solar batteries comprising the texturing layer having an irregularity, has been disclosed, in order to improve light conversion efficiencies and the like, in the fields such as the organic thin film solar battery (e.g., JP2008-177549A).

More specifically, it is the transparent electrode substrate for a solar battery consisting of the resin film, the texturing layer having an irregularity and the metal oxide film, wherein it is characterized in that the texturing layer having the irregularity is composed of a cured product of photo-curable composition.

Also, as an anodizing film, the method for forming a nano-structure pattern directly to a metal film or a metal oxide film has been proposed. Namely, the method for obtaining a porous material having a pore self-regularly by using an electrochemistry has been proposed (e.g., JPH2-254192A).

More specifically, as shown in FIG. 27A-FIG. 27F, it is the method for obtaining a porous material.

That is, as shown in FIG. 27A, an anodizing film (anodizing film barrier layer 202 and anodizing film porous layer 203) is formed on the surface which becomes a matrix 201 by anodizing aluminum material.

Then, as shown in FIG. 27B, the obtained anodizing film is used as the matrix 201, and a metal 205' which is a negative mold of the porous film is filled in a pore of the matrix 201.

Further, as shown in FIG. 27C, the matrix 201 is dissolved selectively. Further, as shown in FIG. 27D, a negative mold 205 of the porous film is obtained by removing anodizing film 202, 203.

Still further, as shown in FIG. 27E, the other material 206' is filled into the negative mold 205 of the porous film.

Lastly, as shown in FIG. 27F, a porous material 206 which has the same shape as the anodizing film is obtained by dissolving the negative mold 205 selectively.

However, according to the formation method described in JPH9-157855A, the ultraviolet irradiation exposure time is long and some substrates would easily suffer damages from the ultraviolet irradiation exposure, an ultraviolet irradiation exposure equipment is very expensive and it is not easy to produce the metal oxide film having a large area continuously.

Also, according to the formation method described in JP200-327310A, there is a problem that many producing steps are necessary, since the metal oxide sol must be beforehand changed into the metal oxide gel.

Further, according to the formation methods described in JPH9-157855A and JP200-327310A, there are no descriptions or suggestions regarding the formation of the predetermined surface irregularity as well as no referring to the specific means to form such surface irregularity stably.

Also, according to the formation method described in JP2008-177549A, it is necessary to provide the conductive layer including a metal film or a metal oxide film on the texturing layer having the surface irregularity and there is a problem that such a metal film or a metal oxide film are easy to exfoliate from the texturing layer.

Further, according to the formation method of the porous material described in JPH2-254192A, there are problems that many manufacturing steps are necessary and it is not easy to make the porous material precisely and stably.

On the other hand, conventionally, although electrically conductive layers comprising the metal oxide film (ITO or IZO) having a pattern are widely used as a transparent electrode, the predetermined patterns are usually formed by the etching treatment using the strong acid as an etchant solution, after formation of the metal oxide on the substrate by a vapor deposition process on the substrate.

However, there are problems that the etching speed for ITO or IZO etc is inherently slow, and if such etching speed is increased, the etching precision would be significantly decreased.

Further, the corrosion owing to the etchant solution (strong acid) residue easily occurs, and it is necessary to have the neutralization process of the etchant solution, a washing process having a considerable time and the conditioner process respectively in the manufacturing method.

Thus, the present inventors have keen studied the above mentioned problems, they have discovered that the metal oxide film having both a predetermined surface irregularity and a predetermined pattern or either, could be obtained by a thermal oxidation treatment or a plasma oxidation treatment easily and stably, after having formed both a predetermined surface irregularity and a predetermined pattern or either to the coated film which is coated a liquid material containing at least one of metal salts and metal complexes, and they have accomplished the present invention.

Namely, the objective of the present invention is to provide a method for easily and stably forming a metal oxide film having both a predetermined surface irregularity and a predetermined pattern or either, and having an excellent surface specific resistance and transparency and the like, without changing beforehand into the metal oxide gel from the metal oxide sol when the metal oxide film is formed.

Further, another objective of the present invention is to provide a metal oxide film having both a predetermined surface irregularity and a predetermined pattern or either obtained by the aforementioned method.

SUMMARY OF THE INVENTION

According to the present invention, a method for forming a metal oxide film having both a surface irregularity and a predetermined pattern, or either on a substrate is provided.

Namely, the said method for forming the metal oxide film includes a first process to a third process.

(1) The first process: a liquid material containing both a metal salt and a metal complex or either (hereinafter may be referred to as "a liquid material containing a metal salt") is coated on a substrate to form a coated film (hereinafter may be referred to as "metal salt film").

(2) The second process: both a surface irregularity and a predetermined pattern or either is formed to the coated film.

(3) The third process: a thermal oxidation treatment or a plasma oxidation treatment under the condition of existence of oxygen, is carried out to the coated film which has both a surface irregularity and a predetermined pattern or either, to form to a metal oxide film having both a surface irregularity and a predetermined pattern or either.

Thus, without changing the metal salt to the metal oxide gel after coating of the metal salt on the substrate in the first process, by forming the predetermined surface irregularity or the predetermined pattern to the coated film in the second process, and by carrying out the predetermined oxidation treatment in the third process, a metal oxide film having a predetermined surface irregularity or a predetermined pattern could be obtained stably and having an excellent surface specific resistance and transparency and the like.

Note that when the plasma treatment is carried out to form the surface irregularity or the predetermined pattern in the second process, and the plasma oxidation treatment is carried out for oxidation in the third process, the same plasma device could be used successively. As a result, the metal oxide film having a predetermined surface irregularity or a predetermined pattern could be obtained more quickly and economically.

In addition, if a liquid material containing a metal salt is pattern-printed on a substrate in the first process, a predetermined pattern is formed as is, thus the first process and the second process will be performed at the same time, and the metal oxide film having a predetermined pattern could be finally obtained more quickly and economically.

Also, in carrying out the method for forming the metal oxide film according to the present invention, it is preferred to use liquid material containing a metal salt including zinc or indium, or liquid material containing a metal complex including zinc or indium, as liquid material containing both a metal salt and a metal compound or either.

By using such liquid materials, it would be enabled to increase light transmittance of the obtainable metal oxide film and to decrease s surface specific resistance of the obtainable metal oxide film.

Note that, if the predetermined amount of a dopant precursor is added to a liquid material containing both a metal salt and a metal complex or either, it would be much possible to lower the value of the surface specific resistance of the metal oxide film.

Also, in carrying out the method for forming the metal oxide film according to the present invention, it is preferred to form the surface irregularity of 30 nm or more to the surface of the coated film as a center line average surface roughness (Ra) in the second process.

By forming such a surface irregularity, it would be possible to obtain the metal oxide film having surface irregularity for using as electrode for an electronic device and the like with a good transparency and conductivity.

Also, in carrying out the method for forming the metal oxide film according to the present invention, it is preferred to form surface irregularity and a predetermined pattern by using a plasma etching treatment and to use both rare gas and nitrogen or either as plasma generation gas of the plasma etching treatment in the second process.

By carrying out such a method according to the present invention, it would be possible to form a predetermined surface irregularity and a predetermined pattern effectively to the coated film, and to obtain the precise metal oxide film having both a predetermined surface irregularity and a predetermined pattern or either.

Also, in carrying out the method for forming the metal oxide film according to the present invention, it is preferred to set the temperature of the plasma treatment to be a value within the range of 20 to 100° C. in the second process and to set the plasma treatment pressure to be a value of within the range of 1 to 500 Pa.

By carrying out such a method for forming the metal oxide film, it would be possible to obtain the metal oxide film having both a predetermined surface irregularity and a predetermined pattern or either, more stably and economically.

Also, in carrying out the method for forming the metal oxide film according to the present invention, it is preferred to provide the second' process between the first process and the second process, wherein the coated film should be partially oxidized by a plasma oxidation treatment or a thermal oxidation treatment.

By carrying out such a present method for forming the metal oxide film, it would be possible to adjust the plasma etching speed to the coated film partially oxidized in the specific range when the plasma etching treatment is applied.

Also, the metal salt film partially oxidized could be used as a resist (as an etching speed adjustment member) on the substrate.

Also, in carrying out the method for forming the metal oxide film according to the present invention, it is preferred to set the temperature of the thermal oxidation treatment to be a value within the range of 300 to 800° C. when the thermal oxidation treatment is applied in the third process.

By carrying out such a present method for forming the metal oxide film, it would be possible to obtain the metal oxide film having both a predetermined surface irregularity and a predetermined pattern or either, more stably and economically.

Also, in carrying out the method for forming the metal oxide film according to the present invention, when the plasma oxidation treatment is applied in the third process, it is preferred to use oxygen as plasma generation gas of the plasma oxidation treatment and to set the plasma treatment pressure to be a value within the range of $1.0\times10^{-3}$ to $1.0\times10^{2}$ Pa, to set the a time for a plasma treatment to be a value within the range of 10 to 600 seconds, and to set the temperature of the plasma oxidation treatment to be a value within the range of 20 to 100° C.

By carrying out such a method for forming the metal oxide film, it would be possible to obtain the metal oxide film having both a predetermined surface irregularity and a predetermined pattern or either, more stably and economically.

Further, by carrying out such a present method for forming the metal oxide film, it would be possible to lower the temperature of the plasma oxidation treatment such as around 20 to 100° C. to prevent the heat degradation of the substrate.

Also, in carrying out the method for forming the metal oxide film according to the present invention, it is preferred to provide a fourth process after the third process, and further to provide a metal film or another metal oxide film which is different from the above-mentioned metal oxide film on the metal oxide film.

By providing a further metal film or another metal oxide film, it would be possible to obtain the metal oxide film having the much low surface specific resistance.

Also, the another aspect of the present invention is to provide a metal oxide film having both a surface irregularity and a predetermined pattern or either, and having a surface specific resistance of $1.0\times10^{0}$ to $1.0\times10^{10}\Omega/\square$, which is obtained by the above-mentioned method for forming the metal oxide film.

By constituting such a metal oxide film, it would be possible to obtain the metal oxide film having a predetermined surface irregularity and having a low surface specific resistance, which are suitable for the transparent electrodes.

Also, in constituting the metal oxide film according to the present invention, the metal oxide film is an electrode for an electronic device.

By constituting such a metal oxide film, it would be possible to obtain the metal oxide film having the predetermined surface irregularity and having excellent surface specific resistance and transparency, which are suitable for the electrodes of the electronic devices.

FIRST EMBODIMENT

Detailed Description of the Preferred Embodiments

Figure 1A:
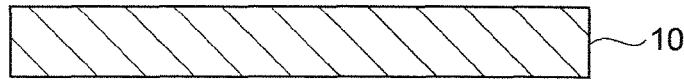
FIG. 1A-1E are figures to offer to describe a method for forming metal oxide film of the present invention (embodiment example 1).

The first embodiment of the present invention is a method for forming a metal oxide film, as metal oxide film 14, having a surface irregularity 14a on a substrate 10 as shown in FIG. 1A to 1E, wherein, the method comprises a first process in which a liquid material containing a metal salt or a metal complex is applied on substrate 10 to form a metal salt film 12, a second process in which a surface irregularity 12a is formed to the metal salt film 12, and a third process in which the metal salt film 12 having a surface irregularity 12a is subjected to thermal oxidation treatment or plasma oxidation treatment under the condition of existence of oxygen source ($O_2$) to convert to a metal oxide film 14 having a surface irregularity 14a.

Note that a value of surface roughness as a center line average surface roughness (Ra) could be measured by using an atomic force microscope (SPA300HV made by SII NanoTechnology Inc.).

Further, the center line average surface roughness (Ra) in the present invention is defined as the following formula (1).

[Formula 1]

$$Ra = \frac{1}{S0} \int_{Y_B}^{Y_T} \int_{X_L}^{X_R} |F(X, Y) - Z_0| dX dY \quad (1)$$

Ra: center line average surface roughness (nm)
F(X,Y): a plate specified by all measurement data (a value Z for (X,Y) coordinates)
$S_0$: an area when it was assumed to be ideally flat from a designated surface ($nm^2$).
$Z_0$: mean values (nm) for designated surface.

Figure 1B:
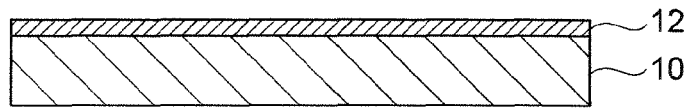
Figure 1C:
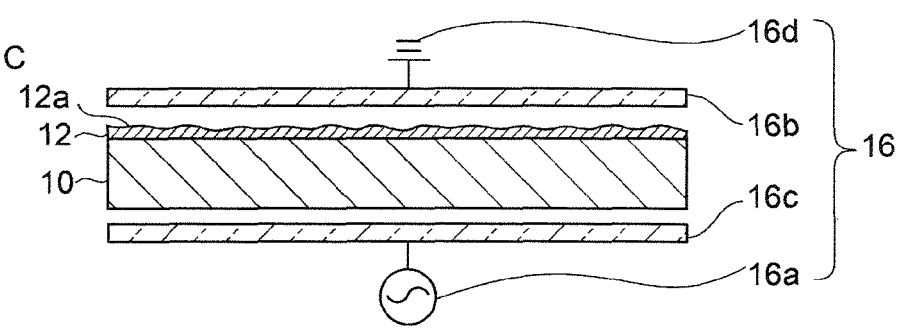
Figure 1D:
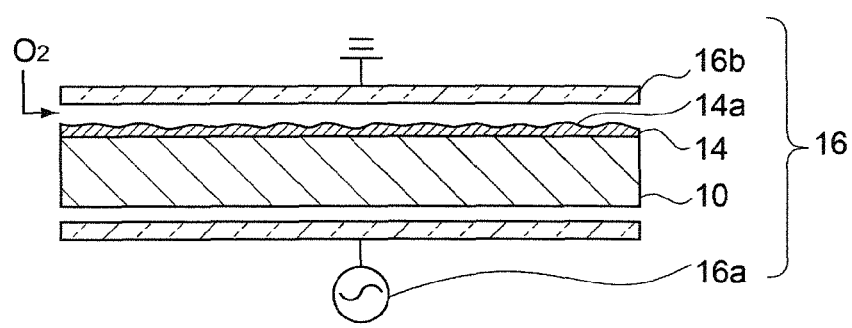
Figure 1E:
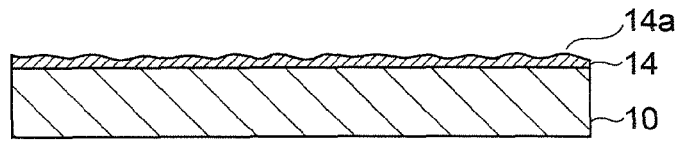

Also, FIG. 1A shows a process for preparing a predetermined substrate 10. FIG. 1B shows a process in which a liquid material containing a metal salt or a metal complex (a liquid material containing a metal salt) is applied on substrate 10 to form a predetermined metal salt film 12. FIG. 1C shows a process in which a metal salt film 12 is subjected to a plasma treatment (plasma etching treatment) to form a surface irregularity 12a. FIG. 1D shows a process in which a metal salt film 12 having surface irregularity 12a is subjected to a predetermined oxidation treatment (e.g., a plasma oxidation treatment) to convert to a metal oxide film 14 having such as surface irregularity 14a shown in FIG. 1E.

An embodiment of the method for forming a metal oxide film in the present invention will be specifically described in detail as following, with appropriately referring to figures.

1. First Process (1) Substrate

As a kind of the substrate 10 which is shown in FIG. 1A and which is not limited to, for example a resin film, a glass substrate, a ceramic substrate, or a metal substrate could be used.

Also, as a resin film, the following resin films which are made from a polyimide resin, a polyamide resin, a polyamide-imide resin, a polyphenylene ether resin, a polyether ketone resin, a polyetheretherketone resin, a polyolefin resin, a polyester resin, a polycarbonate resin, a polysulfone resin, a polyether sulfone resin, a polyphenylene sulfide resin, a polyalylate resin, an acrylic resin or its derivative, an alicyclic structure containing polymer resin, an aromatic polymer resin or its derivatives are available.

Among these resin films, a substrate consisting of a polyester resin or a polyamides resin is particularly preferable because of high versatility.

More concretely, a polyethylene telephthalate resin, a polybutylene terephthalate resin, a polyethylene naphthalate resin, a polyalylate resin, or the like, could be used as the polyester resin films.

Also, all aromatic polyamide, nylon 6, nylon 66 or nylon copolymer could be used as polyamide resin films.

Note that it is preferred to carry out at least one surface treatment such as a coupling agent treatment, an oxidizing flame treatment, a silicic acid flame treatment, a corona treatment, a plasma treatment, a primer treatment, a blast treatment, an acid treatment, or the like on the above substrate surface, beforehand, in order to improve the adhesion and the conductivity between the substrate and the metal oxide film to form.

It is more preferred that a wet index (measurement in accordance with JIS K6768) of a substrate surface is set to be a value within the range of 20 to 80 dyn/cm as the standard for the surface treatment of the substrate. It is more preferred that the wet index is set to be a value within the range of 30 to 75 dyn/cm, and much more preferred that the wet index is set to be a value within the range of 40 to 70 dyn/cm.

Also, although there is not the limitation for a thickness of a substrate, for example, in the case using of a resin film, it is preferred that a thickness of a substrate is usually set be a value within the range of 1 to 3000 μm.

This is because when a substrate is below 1 μm in thickness, there are cases that the mechanical strength and the handling ability extremely decreases, and that a metal oxide film having uniform thickness could not be stably formed.

On the other hand, this is because if a substrate is over 3000 μm in thickness, there are cases that the handling ability extremely decreases, that applications of an obtained metal oxide film are extremely limited, and moreover, that it is economically disadvantageous to use it.

Therefore, it is more preferred that a substrate thickness is set to be a value within the range of 5 to 1500 μm, and much more preferred that the thickness is set to be a value within the range of 10 to 1000 μm.

Figure 2A:
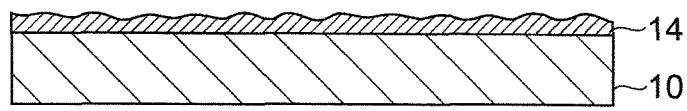
FIG. 2A-2D are figures to offer to describe a stack obtained by a method for forming a metal oxide film of the present invention.
Figure 2B:
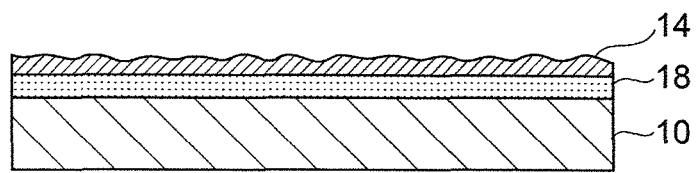

Further, the metal oxide film 14 on the substrate 10 could be directly formed as shown in FIG. 2A, or after a surface treatment is carried out on the substrate 10, the metal oxide film 14 on the treated surface could be formed as shown in FIG. 2B.

As a surface treatment, a primer treatment, a corona treatment or a flame treatment could be carried out, and a primer treatment is particularly preferable.

This is because by using such a substrate on which a primer layer (primer film) is formed, the adhesion of a metal oxide film on a substrate could be further improved.

Note that material forming such a primer layer could be cellulose ester (e.g., cellulose acetate, cellulose acetate propionate, cellulose acetate butyrate, cellulose nitrate and combinations thereof), polyacrylic, polyurethane, polyvinyl alcohol, polyvinyl ester, polyvinyl acetal, polyvinyl ether, polyvinyl ketone, polyvinyl carbazole, polyvinyl butyral and combinations thereof.

Also, thickness of a primer layer is not limited, but it is set to be a value between 0.05 μm and 10 μm could be used.

(2) Liquid Material Containing a Metal Salt or a Metal Complex

The liquid material used in the present invention usually contains both a metal salt and a metal complex or either, and a specified amount of a solvent.

Further, since a surface specific resistance could be significantly decreased while keeping excellent properties of a metal oxide film such as a light transmittance or the like, it is preferred to mix a metal complex and a specified amount of a dopant precursor in the liquid material.

(2)-1 Metal Salt

Here, above-mentioned metal salts include, which are not limited to in particular, for example, inorganic salts such as halogenide, nitrate, sulfate, or the like, and organic salts such as organic phosphate, carboxylate.

Chloride or bromide is usable as halogenide, and chloride is preferable.

Also, as carboxylate, a salt is usable such as acrylic acid, methacrylic acid, acetic acid, salicylic acid, formic acid, oxalic acid, propionic acid, lactic acid, trifluoroacetic acid, fumaric acid, itaconic acid, maleic acid, or the like.

As a kind of metal to form a metal salt, such as platinum (Pt), gold (Au) silver (Ag), copper (Cu), zinc (Zn), indium (In), tin (Sn), gallium (Ga), titanium (Ti), nickel (Ni), germanium (Ge), or cadmium (Cd) is usable.

Therefore, as a metal salt, copper acetate, cadmium acetate, zinc acetate, mercury acetate, lead acetate, gallium acetate, indium acetate, thallium acetate, titanium acetate, manganese acetate, nickel acetate, molybdenum acetate, palladium acetate, silver acetate, or the like, is usable.

Particularly, the metal salt including at least one metal among zinc (Zn), indium (In) and tin (Sn) is preferable, since a metal oxide film having transparency could be obtained.

It is more preferred that a metal salt includes zinc (Zn) or indium (In), since the metal oxide film having a higher light transmittance and a lower surface specific resistance could be obtained. The metal salt might include only one kind or a combination of two or more kinds.

Note that transparency here means that at least visible light penetrates, and it is preferred that the visible light transmittance is equal to or over 50%.

(2)-2 Metal Complex

Also, as a metal complex, a compound having a metal or metal ion at the center of the molecular, which consists of so called ligands with unshared electron pairs surrounding the metal or metal ion, could be appropriately used.

More specifically, a compound is usable, which includes monodentate ligand such as pyridine, triphenylphosphine, a nitric acid ion, a halide ion, ammonia, or the like, bidentate ligand such as ethylenediamine, biviridine, acetylacetonate, phenanthroline, or the like, and tridentate ligand such as terpyridine, ethylenediaminetetraacetic acid, or the like.

As a kind of metal to form a metal complex, a metal such as iron (Fe), cobalt (Co), nickel (Ni), copper (Cu), zinc (Zn), indium (In), or titanium (Ti), could be used.

Particularly, a metal complex containing zinc (Zn) or indium (In) is more preferable since a metal oxide film having a higher light transmittance and a lower surface specific resistance, could be obtained.

Thus, a preferred metal complex could be zinc acetylacetonate, indium (III) acetylacetonate, titanium oxide (IV) acetylacetonate, or the like. A more preferred metal complex could be zinc acetylacetonate, indium (III) acetylacetonate. The metal complex may include only one kind or a combination of two or more kinds.

(2)-3 Dopant Precursor

Also, as liquid material, a specified amount of dopant precursor which is to be dopant, is preferable to mix with the liquid material.

This is because a surface specific resistance of a metal oxide film significantly reduces while keeping excellent properties with respect to light transmittance, or the like, when such dopant precursor is mixed.

Dopant is a compound which includes a metal, different from a used metal salt or a used metal complex, and the metal is selected in accordance with a kind of the used metal salt or the used metal complex. As dopant, a compound including such metal as gallium (Ga), aluminum (Al), silicon (Si), tin (Sn), scandium (Sc), or the like, are used. Only one kind or a combination of two or more kinds such as gallium (III) acetylacetonate, aluminum acetylacetonate, tin (II) acetylacetonate, or the like, is preferable.

Also, as an addition amount of a dopant precursor, it is preferred that an amount of a metal of a dopant precursor is set to be a value within the range of 1 to 10 mol %, against the total amount of the metal which is included in a metal salt or metal complex and the metal which is included in a dopant precursor.

This is because when the addition amount of a dopant precursor is below 1 mol %, there may be cases that an effect by addition does not reveal or that a surface specific resistance of obtained metal oxide film varies.

On the other hand, this is because when an addition amount of a dopant precursor is over 10 mol %, there may be cases that an effect by addition does not improve, or conversely that the effect rather decreases.

Thus, it is more preferred that an addition amount of a dopant precursor is set to be a value within the range of 2 to 8 mol %, and much more preferred that the addition amount is set to be a value within the range of 3 to 7 mol %.

(2)-4 Solvent

Also, as a solvent for constituting a liquid material, for example, nitrile compounds such as acetonitrile, propionitrile, or the like, alcohols such as methanol or ethanol, acetone, N, N-dimethylformamide, dimethyl sulfoxide, water, or the like, is usable.

(2)-5 Concentration

Also, as liquid material containing a metal salt or a metal complex, it is preferred that a concentration of a metal salt or a metal complex is set to be a value within the range of 0.01 to 15 mol %/L (liter).

This is because when a concentration of a metal salt or a metal complex is below 0.01 mol %/L, there are cases that pinholes are easily formed in a obtained coating film and a surface specific resistance of the obtained metal oxide film increases.

On the other hand, this is because when a concentration of a metal salt or a metal complex is over 15 mol %/L, there are cases that a metal salt or a metal complex settles out in the liquid material and the obtained metal oxide film does not form uniformly.

Thus, it is more preferred that the concentration of a metal salt or a metal complex is set to be a value within the range of 0.02 to 10 mol %/L, and much more preferred that the concentration is set to be a value within the range of 0.03 to 5 mol %/L.

(2)-6 Viscosity

It is preferred that a viscosity of a liquid material containing a metal salt or metal complex (a measurement temperature is 25° C.) is set to be a value within the range of 0.1 to 5000 mPa·sec, and more preferred that the viscosity is set to be a value within the range of 1 to 1000 mPa·sec.

This is because when the viscosity of said liquid material is within such range, it is easily to form the coating film with a uniform thickness.

(3) Coating Method

As coating with liquid material containing a metal salt, it is not limited to a coating method in particular. A well-known coating method would be applicable.

More specifically, a dipping method, a spin coat method, a knife coat method, a bar coat method, a blade coat method, a squeeze coat method, a reverse roll coat method, a gravure roll coat method, a curtain coat method, a spray coat method, a die coat method, a ink-jet method, or the like, are usable.

For example, it is preferred to use a spin coat method or a gravure roll coat method in order to coat a metal salt film having a more uniform thickness with the liquid material containing a metal salt.

Also, since the liquid material containing a metal salt is normally water-soluble, an ink-jet method is preferable in order to form a predetermined pattern quickly with high precision.

Moreover, the metal salt film could be heated and dried, if necessary, after it is coated with the liquid material containing a metal salt.

Note that it is preferred that a thickness of a metal salt film is usually a value within the range of 50 to 1000 nm.

This is because when the thickness of the metal salt film is within a value of such range, a predetermined surface irregularity is easily formed and strength, a surface specific resistance and a light transmittance of the obtained metal oxide film becomes excellent.

2. Second Process

The second process is a process in which a predetermined surface irregularity 12a is formed to a flat metal salt film 12 by a predetermined treatment method as shown in FIG. 1C.

That is, although a various mechanical or chemical treatment would be applicable in order to form a surface irregularity, such as an imprint method or an etching method, the following plasma treatment is more preferable because a predetermined surface irregularity is formed stably with a high precision.

(1) Plasma Generation Gas

On the occasion of practicing a plasma treatment, it is preferred to use both rare gas and nitrogen gas or either, as a plasma generation gas.

This is because a surface irregularity with a predetermined shape and with a predetermined height could be formed to a metal salt film by using such gas. As a result, a metal oxide film having a surface irregularity with a predetermined shape and with a predetermined height could be obtained with a higher precision.

Figure 3:
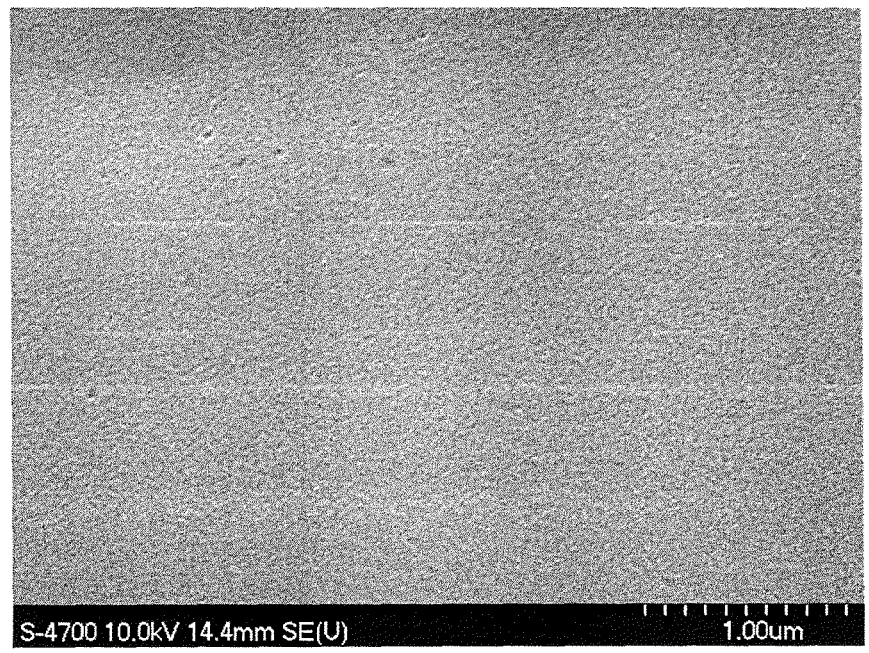
FIG. 3 is a photograph showing the surface state on the metal salt film (magnification: 30,000 times).
Figure 4:
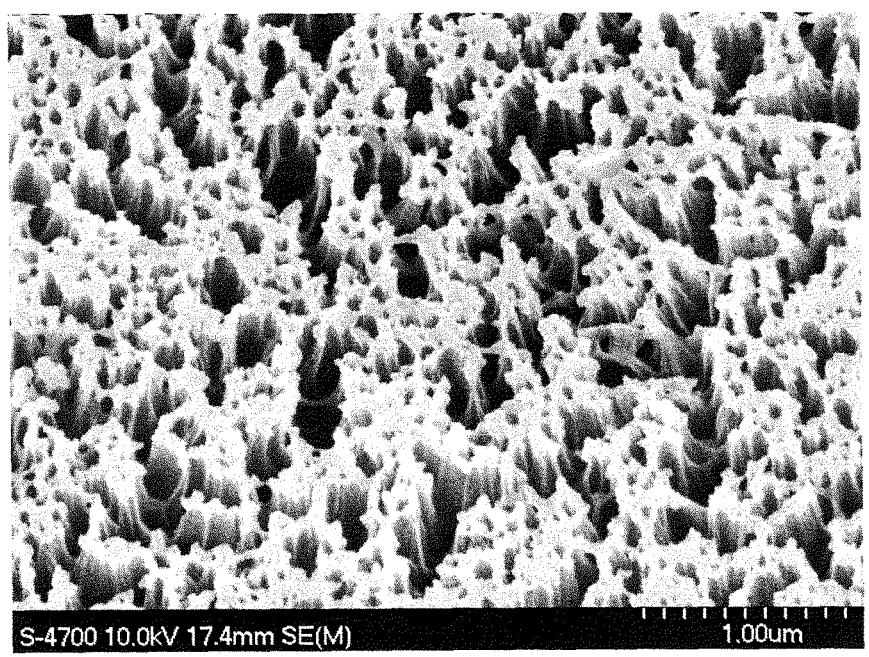
FIG. 4 is a photograph showing the surface state of the metal salt film having a surface irregularity (magnification: 30,000 times).

That is, although a plasma etching treatment is comparatively easy to apply to a metal salt film because the metal salt film is before an oxidation treatment, a surface irregularity in a brush shape as shown in FIG. 4 could be formed to a metal salt film as shown in FIG. 3, by using such specific gas as krypton gas or nitrogen gas. As a result, a metal oxide film having a surface irregularity with a brush shape as shown in FIG. 5 could be obtained with a higher precision.

Figure 5:
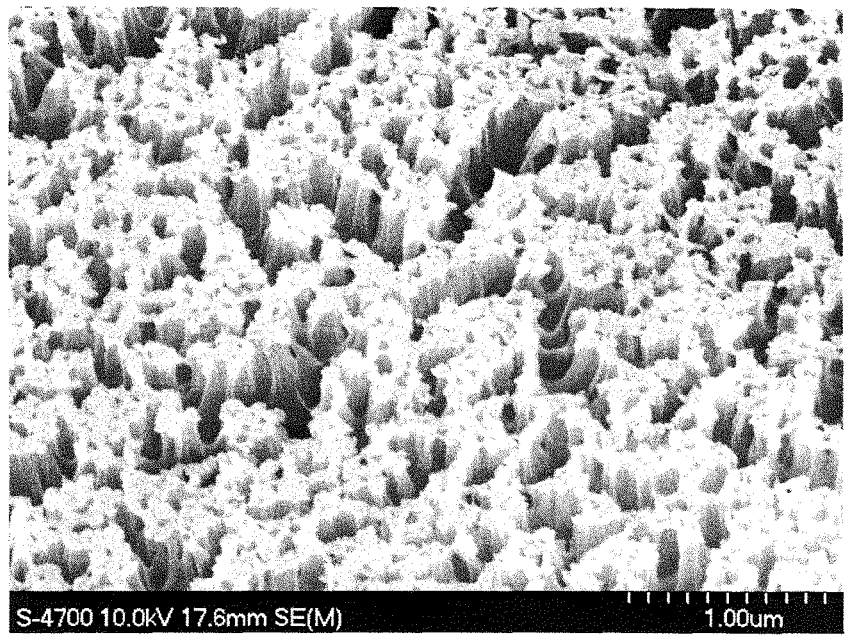
FIG. 5 is a photograph showing the surface state of the metal oxide film having a surface irregularity (magnification: 30,000 times).

Note that FIG. 3-FIG. 5 are pictures of the surface status in which a flat metal salt film before forming a surface irregularity by a plasma treatment, a metal salt film having a surface irregularity after a plasma treatment and a metal oxide film having a surface irregularity after an oxidation treatment are shown, as in example 12 described below.

Figure 6:
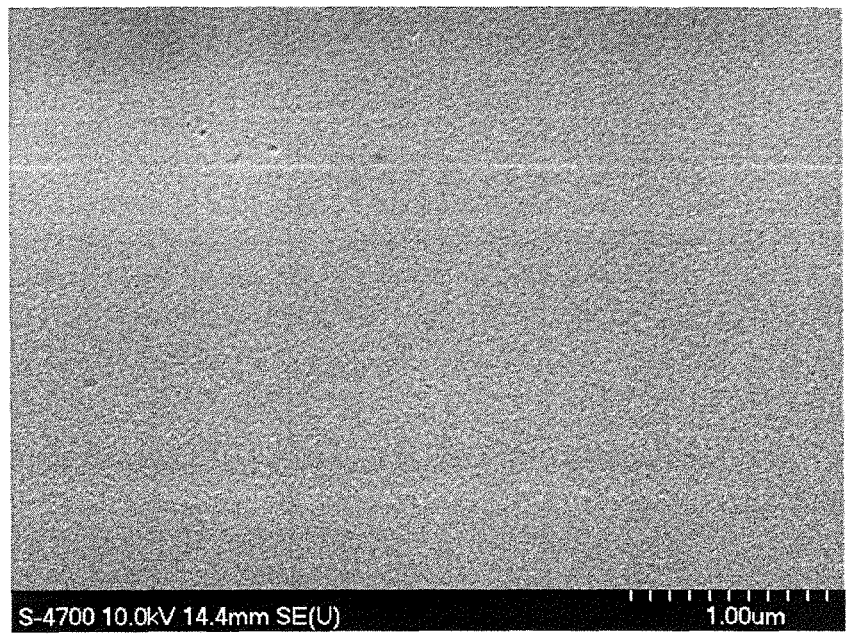
FIG. 6 is a photograph showing the surface state of another metal salt film (magnification: 30,000 times).
Figure 7:
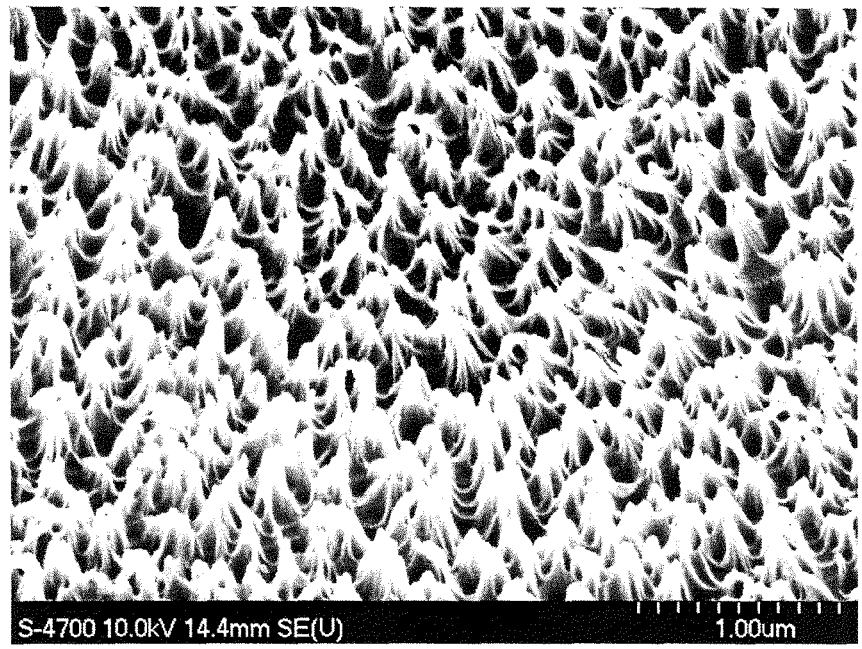
FIG. 7 is a photograph showing the surface state of the metal salt film having another surface irregularity (magnification: 30,000 times).

Also, by changing a kind of plasma generation gas as a condition of a plasma treatment, a surface irregularity with a mountain shape as shown in FIG. 7 could be formed to a metal salt film as shown in FIG. 6, by using for example, argon gas or helium gas. As a result, a metal oxide film having a surface irregularity with a mountain shape as shown in FIG. 8 could be obtained with a higher precision.

Figure 8:
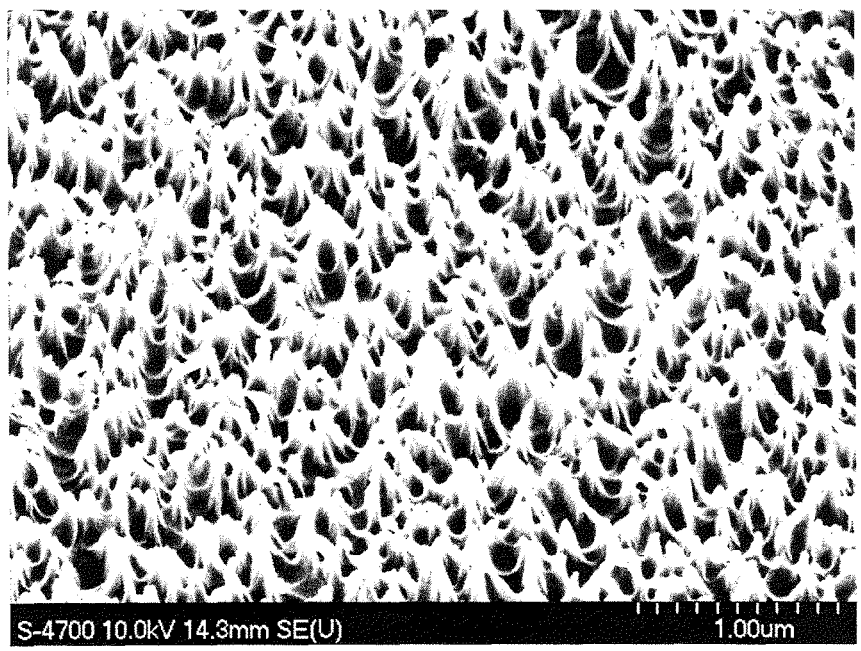
FIG. 8 is a photograph showing the surface state of the metal oxide film having another surface irregularity (magnification: 30,000 times).

Note that FIG. 6-FIG. 8 are pictures of the surface status in which a flat metal salt film before forming a surface irregularity by a plasma treatment, a metal salt film having a surface irregularity after a plasma treatment and a metal oxide film having a surface irregularity after an oxidation treatment are shown, as in example 1 described below.

(2) Temperature of the Plasma Treatment

Also, it is preferred that a temperature of the plasma treatment is to be a value within the range of 20 to 100° C. in the second process.

This is because when the temperature is below 20° C., it takes an excessive time for a plasma treatment, with the result that there are cases that it would be difficult to form a surface irregularity efficiently to a metal salt film.

On the other hand, this is because when the temperature is over 100° C., there are cases that it is difficult to stably form the surface irregularity to a metal salt film or a metal oxide film, that economical efficiency decreases, and that a substrate is occasionally deformed by heating.

Therefore, it is more preferred that a temperature of the plasma treatment in the second process is set to be a value within the range of 25 to 90° C., and much more preferred that the temperature is set to be a value within the range of 30 to 80° C.

Note that a temperature of the plasma treatment is defined as the temperature in a plasma chamber.

(3) Plasma Pressure

Also, it is preferred that a plasma pressure is set to be a value within the range of 1 to 500 Pa in the second process.

This is because when a plasma pressure is below 1 Pa, it takes an excessive time for forming a surface irregularity in a metal salt film, there are cases that it would be difficult to efficiently form the surface irregularity of the predetermined shape to a metal salt film or a metal oxide film.

On the other hand, this is because when a plasma pressure is over 500 Pa, there are cases that it is difficult to efficiently form the surface irregularity of the predetermined shape to a metal salt film or a metal oxide film, and that economical efficiency decreases.

Therefore, it is more preferred that a plasma pressure is set to be a value within the range of 10 to 300 Pa in the second process, and much more preferred that the pressure is set to be a value within the range of 30 to 100 Pa.

Note that a plasma pressure is defined as the pressure in a plasma chamber.

Figure 9A:
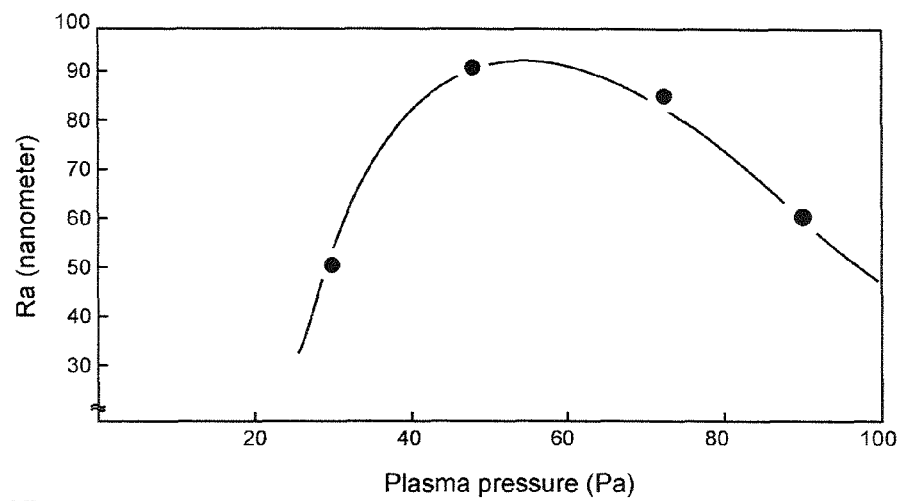
FIG. 9A-9C are figures to offer to describe the influence of the plasma pressure in the second process on a center line average surface roughness (Ra), surface specific resistance and light transmittance of the metal oxide film.
Figure 9B:
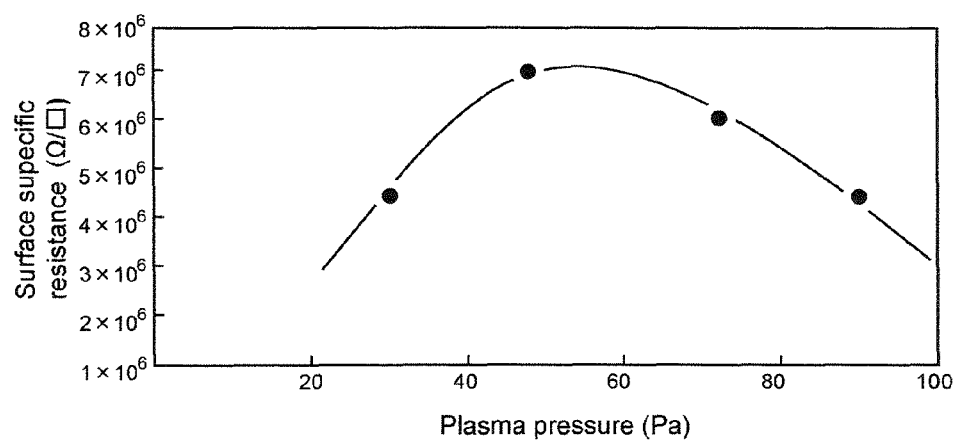
Figure 9C:
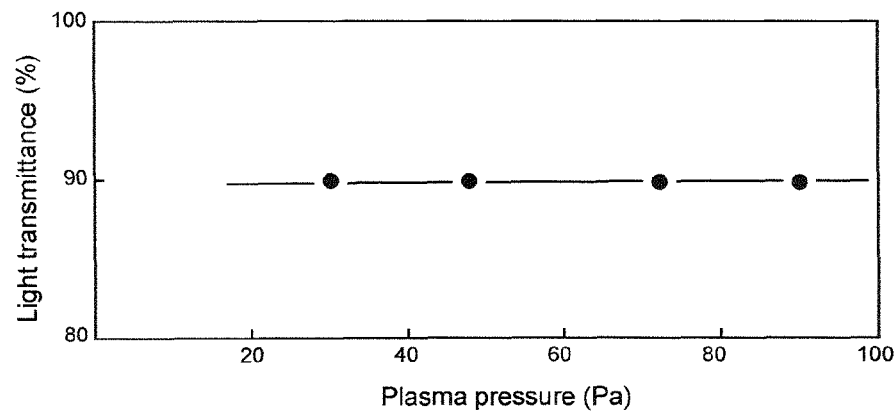

Here, the effects of center line average surface roughness (Ra), surface specific resistance and light transmittance in the metal oxide film by a plasma pressure in the second process will be, respectively, described with referring FIG. 9A to FIG. 9C.

The horizontal axis is a plasma pressure (Pa) and the vertical axis is values (nanometer) of center line average surface roughness (Ra) to the metal oxide film in FIG. 9A.

Then, although the center line average surface roughness (Ra) in the metal oxide film shows lower value as below 50 nm when the plasma pressure is about 30 Pa, as the characteristic curve shows, the center line average surface roughness (Ra) shows comparatively higher value as about 90 nm when the plasma pressure is about 45 Pa.

Further, the center line average surface roughness (Ra) in the metal oxide film slightly decreases to about 80 nm when the plasma pressure is about 70 Pa, and then the center line average surface roughness (Ra) in the metal oxide film decreases to about 60 nm when the plasma pressure is about 90 Pa.

That is, it is understood that the center line average surface roughness (Ra) in the metal oxide film could be obtained with high accuracy within a desired range by adjusting the plasma pressure.

Further, the horizontal axis is a plasma pressure (Pa) and the vertical axis is values of surface specific resistance ($\Omega/\square$) in the metal oxide film in FIG. 9B.

Then, although the surface specific resistance ($\Omega/\square$) in the metal oxide film shows comparatively lower value as about $4 \times 10^6 \Omega/\square$ when a plasma pressure is about 30 Pa, as the characteristic curve shows, the surface specific resistance ($\Omega/\square$) in the metal oxide film shows comparatively higher value as about $7 \times 10^6 \Omega/\square$ when the plasma pressure is about 45 Pa.

Further, the surface specific resistance in the metal oxide film slightly decreases to about $6 \times 10^6 \Omega/\square$ when the plasma pressure is about 70 Pa, and then the surface specific resistance in the metal oxide film decreases to about $4 \times 10^6 \Omega/\square$ when the plasma pressure is about 90 Pa.

That is, it is understood that the surface specific resistance ($\Omega/\square$) in the metal oxide film could be obtained with high accuracy within a desired range by adjusting the plasma pressure.

Further, the horizontal axis is a plasma pressure (Pa) and the vertical axis is values of light transmittance (%) in the metal oxide film in FIG. 9C.

Then, the light transmittance (the visible light transmittance) in a metal oxide film show high value, or over 91%, respectively, when a plasma pressure is 30 Pa to 90 Pa, as the characteristic curve shows, and it is understood that a high light transmittance (%) would remain even when the plasma pressure is changed.

As these results, it is understood that the center line average surface roughness (Ra) and surface specific resistance in the metal oxide film could be obtained within a desired range by adjusting the plasma pressure, while keeping a high light transmittance.

(4) Flow of Plasma Generation Gas

Flow of plasma generation gas is appropriately set up in accordance with a kind of metal salt film, a kind of plasma generation gas, or a formed surface irregularity, and is about 5 to 500 mL/min.

(5) Time for Plasma Treatment

Also, it is preferred that a time for a plasma treatment is set to be a value within the range of 10 to 600 seconds in the second process.

This is because when a time for a plasma treatment is below 10 seconds, there are cases that a predetermined shape of a surface irregularity is difficult to be stably formed.

On the other hand, this is because when a time for a plasma treatment is over 600 seconds, there are cases that the surface irregularity of an obtained predetermined shape is impaired by the plasma, and that a predetermined surface irregularity could be hardly obtained.

Therefore, it is more preferred that the time for a plasma treatment is to be a value within the range of 20 to 500 seconds in the second process, and much more preferred that the time for a plasma treatment is to be a value within the range of 30 to 300 seconds.

(6) Surface Irregularity

The second process characterized that in which a surface irregularity is formed to a metal salt film. As a center line average surface roughness (Ra) of such surface irregularity, it is preferred that the center line average surface roughness (Ra) is a value over 30 nm.

This is because when a center line average surface roughness (Ra) of surface irregularity is excessively large, there are cases that a surface roughness (Ra) of metal oxide film becomes large as well, with a result that a prospective light transmittance could not be obtained owing to diffused reflection of exterior lights. Further, in using a metal oxide film having an excessively large center line average roughness (Ra) as an electrode of solar battery and the like, there are cases that it becomes difficult to uniformly form a semiconductor layer next to an electrode.

Therefore, it is more preferred that the center line average roughness (Ra) of a metal salt film is set to be a value within the range of 40 to 500 nm, and much more preferred that the center line average roughness (Ra) is set to be a value within the range of 45 to 300 nm.

3. Third Process

Third process is the process in which a thermal oxidation treatment or a plasma oxidation treatment is carried out under the condition of existence of oxygen source ($O_2$) as shown in FIG. 1D.

Note that FIG. 1D shows an example of a plasma oxidation treatment in which a conducting metal salt oxide film 14 having a surface irregularity 14a is converted by using a plasma device 16 from a non-conducting metal salt film 12 having a surface irregularity 12a.

(1) Thermal Oxidation Treatment (1)-1 Temperature of Thermal Oxidation Treatment It is preferred that a temperature of a thermal oxidation treatment is set to be a value within the range of 300 to 800° C. in the third process.

This is because when such temperature of a thermal oxidation treatment is below 300° C., there are cases that it is difficult to be oxidized said metal salt or metal complex, and to form a metal oxide, although it depends on a kind of metal salt or a kind of metal complex.

On the other hand, this is because when such temperature of a thermal oxidation treatment is over 800° C., there are cases that the surface irregularity becomes deformed.

Therefore, it is more preferred that a temperature of a thermal oxidation treatment is set to be a value within the range of 350 to 750° C., and much more preferred that the temperature is set to be a value within the range of 400 to 700° C.

(1)-2 Time for a Thermal Oxidation Treatment

It is preferred that a time for a thermal oxidation treatment is set to be a value within the range of 0.1 to 120 minutes, in cases carrying out a thermal oxidation treatment.

This is because when a time for a thermal oxidation treatment is below 0.1 minute, there are cases that it is difficult to be oxidized said metal salt or metal complex, and to form a metal oxide, although it depends on a kind of metal salt or a kind of metal complex.

On the other hand, this is because when such a time for a thermal oxidation treatment is over 120 minutes, there are cases that the surface irregularity becomes deformed.

Therefore, it is more preferred that the time for a thermal oxidation treatment is set to be a value within the range of 1 to 60 minutes, and much more preferred that the time for a thermal oxidation treatment is set to be a value within the range of 5 to 30 minutes.

(1)-3 Source of Oxygen

Also, as a source of oxygen ($O_2$) in which thermal oxidation treatment is carried out, the air or oxygen gas and the like could be used.

(1)-4 Device for a Thermal Oxidation Treatment

Also, with respect to a device for a thermal oxidation treatment, a burning oven having an electric heating device or with an infrared heating device, for example, could be used.

(2) Plasma Oxidation Treatment (2)—1 Source of Plasma

On the occasion of a plasma oxidation treatment according to the present invention, it is preferred to use such a plasma device 16 as an example shown in FIG. 1D, and to use hydrogen, nitrogen, oxygen, argon, helium, fluorocarbons and the like alone or mixed as source of plasma.

Also, the air, oxygen, a compound comprising of oxygen such as water or the like, are appropriately used as a source of oxygen.

Note that a plasma device 16, shown in FIG. 1D, is just an example, which excludes ion sources but at least includes a high frequency electrical power 16a, an upper electrode 16b, a bottom electrode 16c and a ground 16d.

(2)-2 Plasma Pressure

Also, On the occasion of a plasma oxidation treatment, it is preferred that a plasma pressure is set to be a value within the range of $1.0 \times 10^{-3}$ to $1.0 \times 10^2$ Pa.

This is because when a plasma pressure is below $1.0 \times 10^{-3}$ Pa, a plasma concentration is so low that it takes much time to form a metal oxide film.

On the other hand, this is because when a plasma pressure is over $1.0 \times 10^2$ Pa, collisions among formed plasma ion easily occur, with the result that a speedup of forming film is hardly observed.

Therefore, it is more preferred that a plasma pressure is set to be a value within the range of $1.0 \times 10^{-2}$ to $5.0 \times 10^1$ Pa.

(2)-3 Source of Oxygen

Also, the air, oxygen, or a compound comprising an oxygen atom such as water or the like, is appropriately used as a source of oxygen ($O_2$).

(2)-4 Temperature of the Plasma Oxidation Treatment

Also, it is preferred that a temperature of the plasma oxidation treatment is set to be a value within the range of 20 to 100° C.

This is because when a temperature of the plasma oxidation treatment is below 20° C., there are cases that it takes much time for a plasma treatment, with the result that it is difficult to thoroughly oxidize a metal salt film.

On the other hand, when a temperature of the plasma oxidation treatment is over 100° C., there are cases that the surface irregularity of a predetermined shape is impaired by the plasma treatment, that economical efficiency decreases, and further, that a substrate is thermally-deformed.

Therefore, it is more preferred that a temperature of the plasma oxidation treatment in the third process is set to be a value within the range of 25 to 90° C., and much more preferred that its temperature is set to be a value within the range of 30 to 80° C.

(2)-5 Time for a Plasma Treatment

Also, it is preferred that a time for a plasma treatment is set to be a value within the range of 10 to 600 seconds.

This is because when a time for a plasma treatment is below 10 seconds, there are cases that it is difficult to be oxidized said metal salt or metal complex, and to form a metal oxide, although it depends on a kind of metal salt or a kind of metal complex.

On the other hand, this is because when such a time for a thermal oxidation treatment is over 600 seconds, there are cases that that a surface irregularity of a predetermined shape is impaired by the plasma, with the result that it becomes difficult to obtain a predetermined surface irregularity.

Therefore, it is more preferred that the time for a plasma treatment in the third process is set to be a value within the range of 20 to 500 seconds, and much more preferred that the time for a plasma treatment is set to be a value within the range of 30 to 300 seconds.

(2)-6 Multi-Stage Plasma Treatment

Also, a multi-stage plasma oxidation treatment could be carried out. In that case, conditions of plasma oxidation treatment are changeable depending on each stage, or plasma oxidation treatment is carried out multiple times with keeping the same conditions.

A metal oxide film having a predetermined surface irregularity is formed through such processes. It is preferred that surface roughness (Ra) of a metal oxide film is to be a value over 30 nm. This is because when the center line average surface roughness (Ra) is such a value, the metal oxide film has excellent transparency and has surface roughness which is usable as an electrode for electronic devices.

It is more preferred that the surface roughness (Ra) of a metal oxide film is set to be a value within the range of 40 to 500 nm, and much more preferred that the surface roughness (Ra) is set to be a value within the range of 45 to 300 nm.

4. Fourth Process

The fourth process is an optional process in which the second conductive layer comprising of metal or metal oxide is formed, on or adjacent to the first conductive layer. Wherein, the first conductive layer is a metal oxide film formed through the first process to third process.

Owing to forming the second conductive layer provided by the fourth process, the unevenness of surface specific resistance to the first conductive layer could be reduced, the electrical connectivity between electrical connection components by solder and the like could be improved and functions as an auxiliary electrode could be exerted, and further, mechanical strength and durability and the like in the first conductive layer could be improved.

Here, as a metal to form the second conductive layer, only one kind or a combination of two or more kinds such metals as platinum, gold, silver, copper, nickel, molybdenum, aluminum, tungsten, chrome, or their alloys are usable.

Also, as a metal oxide consisting of the second conductive layer, only one kind or a combination of two or more kinds such metal oxides as tin dope oxidation indium (ITO), zinc dope oxidation indium (IZO), oxidation indium, tin oxide, zinc oxide are usable.

Also, as forming the second conductive layer comprising of such metals or such metal oxides, a well-known formation method, for example, vacuum deposition method, sputtering method, ion plating method, print coating method, or the like could be applied.

5. Other Processes

When the liquid material including halide is used as metal salt, hydrogen halide may be generated by a plasma oxidation treatment.

In that case, it is preferable to carry out neutralization process and washing process, or one of such process, after carrying out a plasma treatment.

(1) Neutralization Process

Neutralization process is a process in which a metal oxide film is immersed in alkali aqueous solution such as KOH, NaOH, or the like. In case of carrying out this neutralization process, it is preferred that the process is usually to be carried out in the condition for the time within 1 second to 10 minutes and at the neutralization temperature within 10 to 40° C.

(2) Washing Process

Also, when washing process is carried out, it is preferred that a obtained metal oxide film is washed using, for example, water or alcohol, an organic solvent or mixtures of thereof as washing material. It is preferred that the obtained metal oxide film is usually washed for the time between 1 to 10 minutes, at the temperature between 10 and 100° C., and with the frequency between 1 to 10 times.

6. Embodiment Example

Embodiment examples of the first embodiment mentioned above are the followings. Referring to FIG. 1, and FIG. 10 to FIG. 14, these embodiment examples 1 to 6 are described specifically as follows.

Note that A in FIG. 1 and FIG. 10 to FIG. 14 shows a process to prepare substrate 10, respectively.

(1) Embodiment Example 1

First process: a coating process
Second process: a process forming a surface irregularity by a plasma etching treatment
Third process: an oxidation treatment process by a plasma oxidation treatment FIG. 1B to 1D exemplify from the first process to the third process. By practicing such processes, a metal oxide film 14 having a surface irregularity 14a and a predetermined conductivity and the like as well, is stably manufactured as exemplified in FIG. 1E.

Also, since plasma treatments of the second process to third process are enabled to be successively carried out in a same chamber as shown in FIG. 1C to 1D, it is very economical.

Further, since the plasma oxidation treatment is carried out in the third process as shown in FIG. 1D, the treatment is enabled to be carried out at low temperature, with the result that thermal damage on substrate 10 are effectively avoidable.

(2) Embodiment Example 2

Figure 10A:
FIG. 10A-10E are figures to offer to describe a method for forming a metal oxide film of the present invention (embodiment example 2).
Figure 10B:
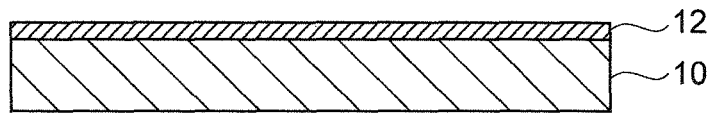
Figure 10C:
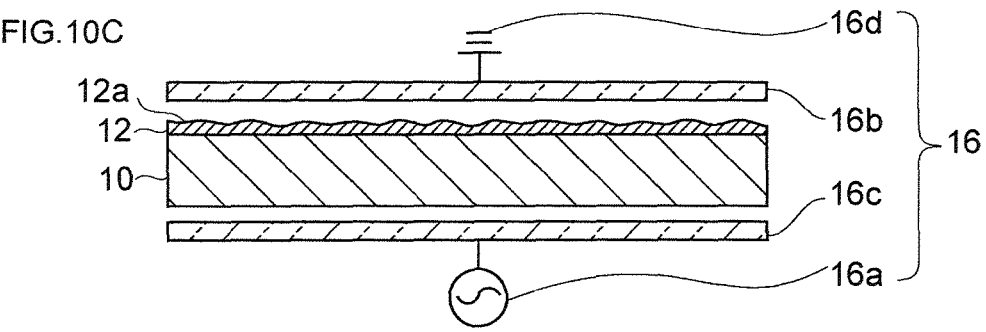
Figure 10D:
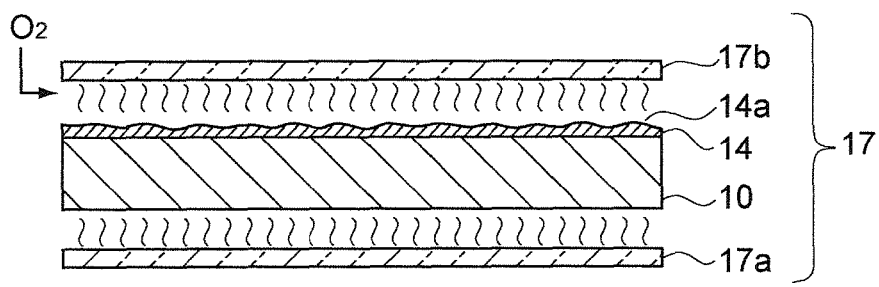
Figure 10E:
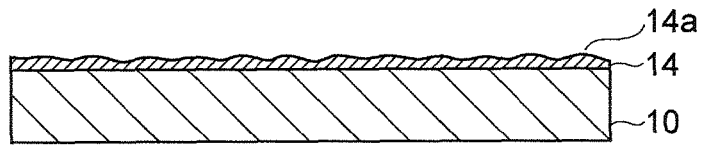

First process: a coating process
Second process: a process forming a surface irregularity by a plasma etching treatment
Third process: an oxidation treatment process by a thermal oxidation treatment FIG. 10B to 10D exemplify from the first process to the third process. By practicing such processes, a metal oxide film 14 having a surface irregularity 14a and a predetermined conductivity and the like as well, is stably manufactured as exemplified in FIG. 10E.

Also, since the thermal oxidation treatment is carried out in the third process as shown in FIG. 10D, a large quantity of oxidation treatment, using for example, a heating furnace 17 (17a, 17b), is enabled to be carried out, and it is very economical.

(3) Embodiment Example 3

First process: a coating process
Second' process: a partial oxidation process by a plasma oxidation treatment
Second process: a process forming a surface irregularity by a plasma etching treatment
Third process: an oxidation treatment process by a plasma oxidation treatment FIG. 11B to 11E exemplify from the first process to the third process. By practicing such processes, a metal oxide film 14 having a surface irregularity 14a and a predetermined conductivity and the like is stably manufactured as exemplified in FIG. 11F.

Figure 11A:
FIG. 11A-11F are figures to offer to describe a method for forming a metal oxide film of the present invention (embodiment example 3).
Figure 11B:
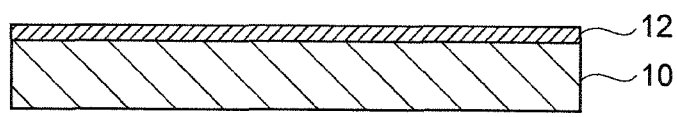
Figure 11C:
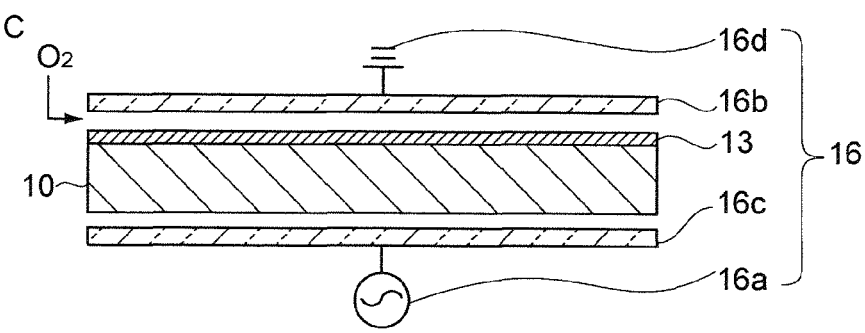
Figure 11D:
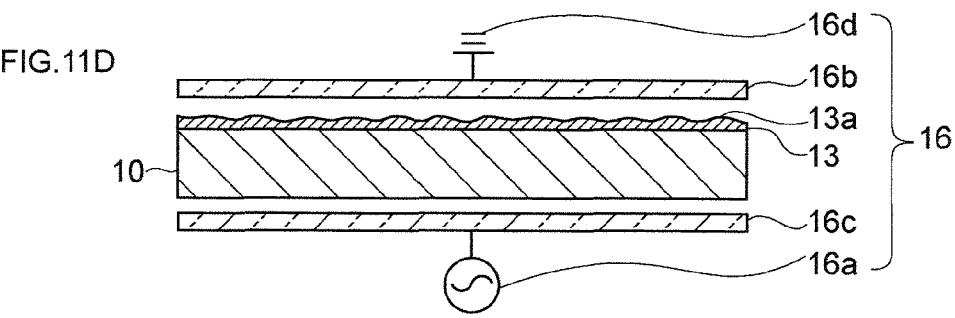
Figure 11E:
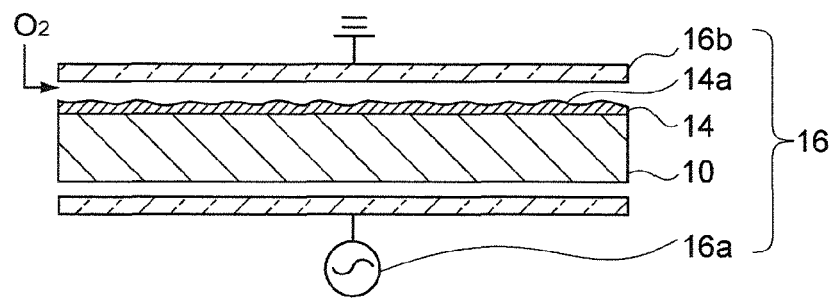
Figure 11F:
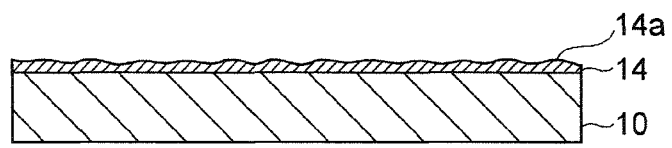

Also, since continuous plasma treatments in the second' process, the second process, and the third process are enabled to successively be carried out in a same chamber as shown in FIG. 11C to 11E, it is extremely economical as a whole.

Also, since the second' process is a partial oxidation process by a plasma oxidation treatment as shown in FIG. 11C, a plasma etching treatment speed could be adjusted in the second process as shown in FIG. 11D.

That is, a phenomenon is found out that when a metal salt film which has fine surface irregularity and which is partially oxidized, is practiced a plasma etching treatment, the plasma etching speed becomes comparatively faster for a thin part of a metal salt film partially oxidized, and the speed becomes comparatively slower for a thick part. (Hereinafter, this phenomenon might be called as etching speed adjustment effect.)

Thus, by using such etching speed adjustment effect, metal salt films which are from a metal salt having fine surface irregularity (e.g., Ra is equals to or below 5 nm) to a metal salt film having comparatively large surface irregularity (e.g., Ra is equals to or over 10 nm), could be stably formed with high accuracy.

In addition, since a plasma oxidation treatment is carried out in the third process as shown in FIG. 11E, the treatment is enabled be carried out at low temperature, with the result that thermal damage on substrate 10 and the like are effectively avoidable.

Note that the aspect of partial oxidation treatment carried out in the second' process will be described in detail in the second embodiment.

(4) Embodiment Example 4

Figure 12A:
FIG. 12A to 12F are figures to offer to describe a method for forming a metal oxide film of the present invention (embodiment example 4).
Figure 12B:
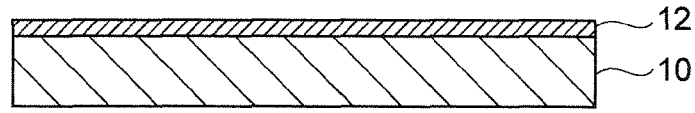

First process: a coating process
Second' process: a partial oxidation process by a thermal oxidation treatment
Second process: a process forming surface irregularity by a plasma etching treatment
Third process: an oxidation treatment process by a plasma oxidation treatment FIG. 12B to 11E exemplify from the first process to the third process. By practicing such processes, a metal oxide film 14 having a surface irregularity 14a and a predetermined conductivity and the like is stably manufactured as exemplified in FIG. 12F.

Figure 12C:
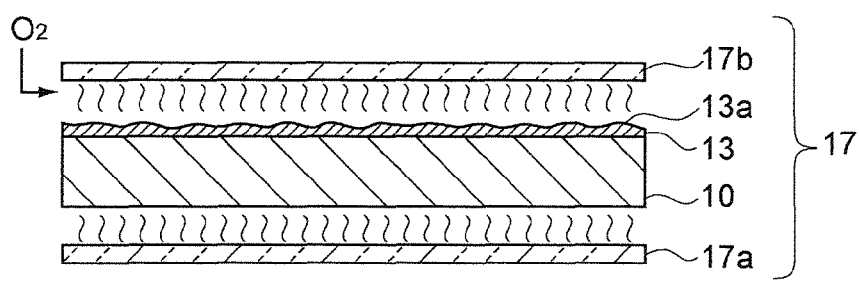
Figure 12D:
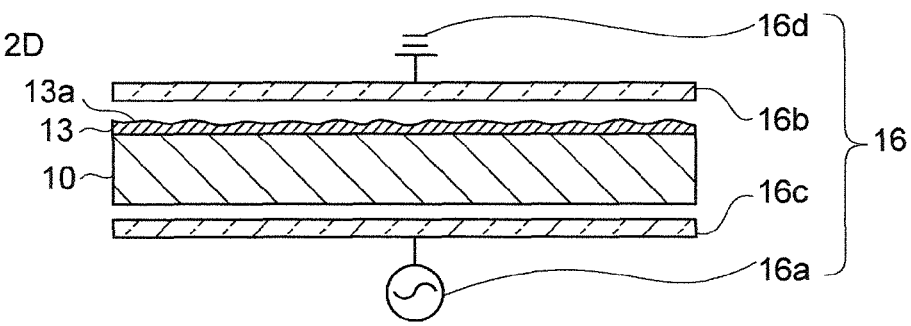
Figure 12E:
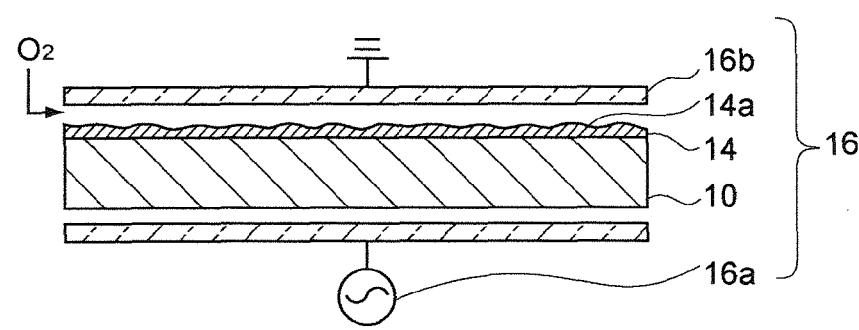
Figure 12F:
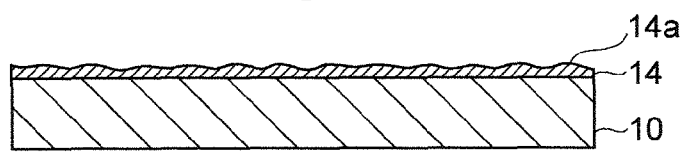

Also, since continuous plasma treatments in the second process to the third process are enabled to be successively carried out in a same chamber as shown in FIG. 12D to 12E, it becomes extremely economical process as a whole.

Also, since the second' process is a partial oxidation process by a thermal oxidation treatment as shown in FIG. 12C, etching speed adjustment effect mentioned above appears. As a result, when a plasma etching treatment is carried out in the next process (the second process), an etching process speed is enabled to adjust as shown in FIG. 12D.

In addition, since a plasma oxidation treatment is carried out in the third process as shown in FIG. 12E, it is enabled carried out at a low temperature, with the result that thermal damage on substrate 10 and the like are effectively avoidable.

(5) Embodiment Example 5

First process: coating process
Second' process: partial oxidation process by a plasma oxidation treatment
Second process: process forming a surface irregularity by a plasma etching treatment
Third process: oxidation treatment process by a thermal oxidation treatment FIG. 13B to 13E exemplify from the first process to the third process. By practicing such processes, a metal oxide film 14 having surface irregularity 14a and a predetermined conductivity and the like as well, is stably manufactured as exemplified in FIG. 13F.

Figure 13A:
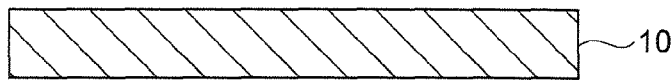
FIG. 13A to 13F are figures to offer to describe a method for forming a metal oxide film of the present invention (embodiment example 5).
Figure 13B:
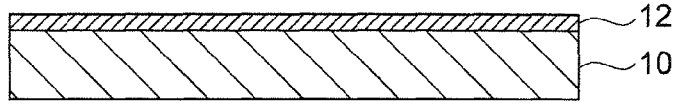
Figure 13C:
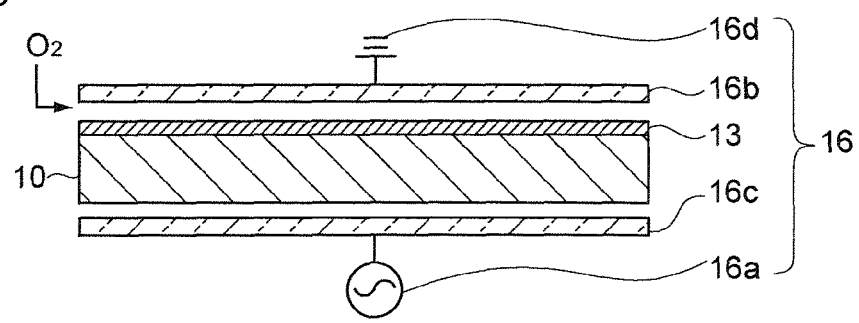

Also, since the second' process is a partial oxidation process by a plasma oxidation treatment as shown in FIG. 13C, etching speed adjustment effect mentioned above appears. As a result, when a plasma etching treatment is carried out in the next process (the second process), an etching process speed is enabled to adjust as shown in FIG. 13D.

Figure 13D:
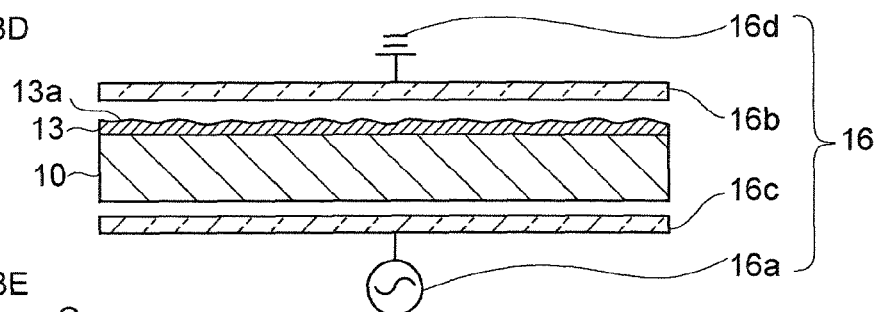

Also, since continuous plasma treatments from the second' process to the second process are enabled to successively be carried out in a same chamber as shown in FIG. 13C to 13D, it is economical as a whole.

Figure 13E:
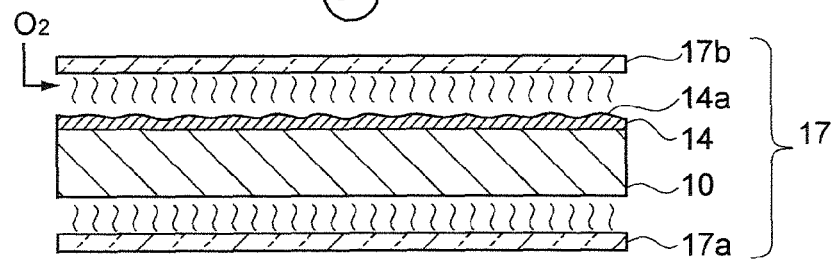
Figure 13F:
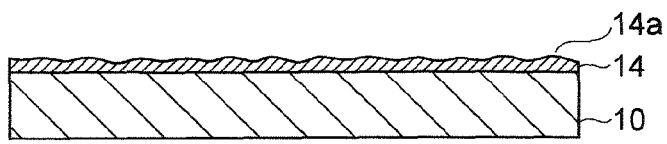

Also, since the thermal oxidation treatment is carried out in the third process as shown in FIG. 13E, a large quantity of oxidation treatment, using for example, a heating furnace 17 (17a, 17b), is enabled to be carried out, and it is very economical.

(6) Embodiment Example 6

First process: a coating process
Second' process: a partial oxidation process by a thermal treatment
Second process: a process forming a surface irregularity by a plasma etching treatment
Third process: an oxidation treatment process by a thermal oxidation treatment FIG. 14B to 14E exemplify from the first process to the third process. By practicing such processes, a metal oxide film 14 having a surface irregularity 14a and a predetermined conductivity and the like as well, is stably manufactured as exemplified in FIG. 14F.

Figure 14A:
FIG. 14A to 14F are figures to offer to describe a method for forming a metal oxide film of the present invention (embodiment example 6).
Figure 14B:
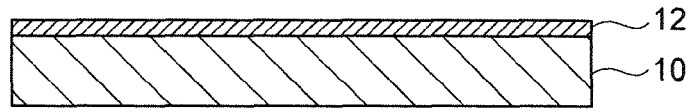
Figure 14C:
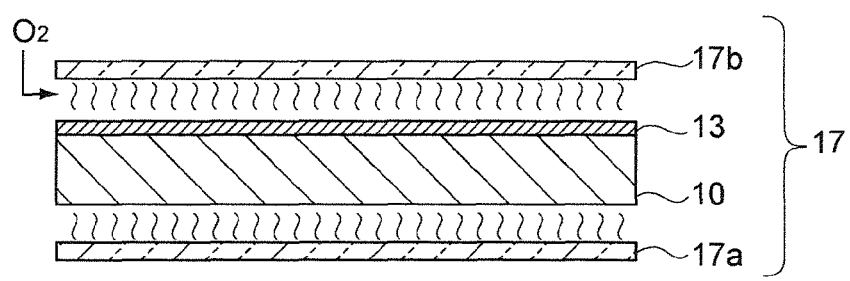
Figure 14D:
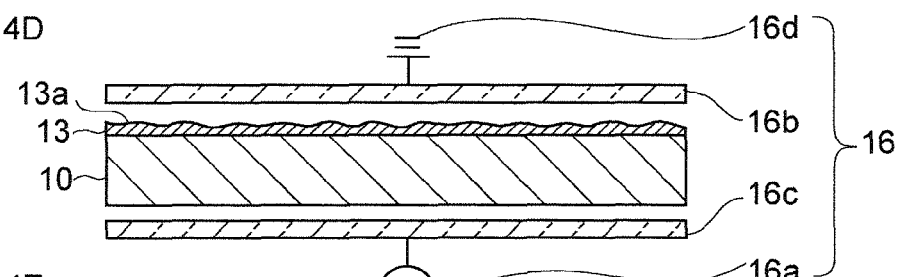

Also, since the second' process is a partial oxidation process by a thermal treatment as shown in FIG. 14C, etching speed adjustment effect mentioned above appears. As a result, when a plasma etching treatment is carried out in the next process (the second process), an etching process speed is enabled to adjust as shown in FIG. 14D.

Figure 14E:
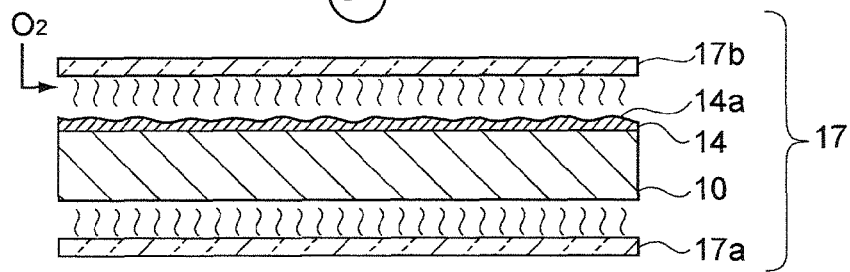
Figure 14F:
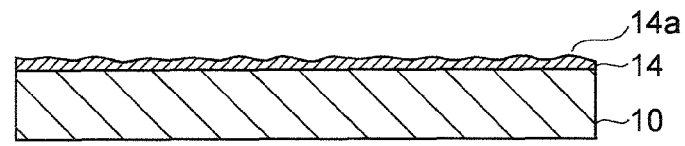

Also, since the thermal oxidation treatment is carried out in the third process as shown in FIG. 14E, a large quantity of oxidation treatment, using for example, a heating furnace 17 (17a, 17b), is enabled to carried out, and it is very economical.

SECOND EMBODIMENT

The second embodiment is a method for forming a metal oxide film, relating to the method of forming a metal oxide film of the first embodiment, wherein the second embodiment is the method for forming a metal oxide film, in which a patterned metal oxide film 14' is formed on a substrate 10 as shown in FIG. 15 and the like, and which is characterized in comprising the first process to third process as mentioned below.

(1) the first process in which a liquid material containing both a metal salt and a metal complex or either is coated on substrate 10 to form a coated film 12

(2) the second process in which a predetermined pattern is formed to a coated film 12.

(3) the third process in which the coated film 12b having a formed predetermined pattern is converted into a metal oxide film 14' having a predetermined pattern by a thermal oxidation treatment or plasma oxidation treatment under the condition of existence of an oxygen source.

The characteristics of the second embodiment are mainly described as following, with appropriately omitting explanations duplicated with the first embodiment.

1. First Process

Figure 15A:
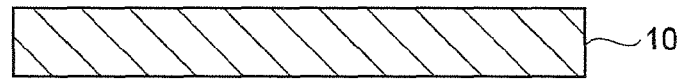
FIG. 15A to 15E are figures to offer to describe a method for forming a metal oxide film of the present invention (embodiment example 7).
Figure 15B:
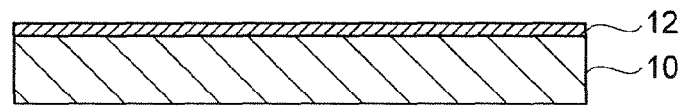

The first process is a process in which a predetermined substrate 10 shown in FIG. 15A is prepared and liquid material containing both a metal salt and a metal compound or either these is applied on a predetermined substrate 10 to form a coated film 12 as shown in FIG. 15B.

Therefore, the first process is basically the same as the first process described in the first embodiment.

However, as described above, when pattern printing with liquid material containing a metal salt is carried out on a substrate, a predetermined pattern is obtained as is. This means that the first process and the second process are carried out at the same time. As a result, a metal oxide film having a predetermined pattern and a predetermined conductivity could be quickly and economically obtained.

Note that the embodiments of the pattern printing will be described in the following second process in detail.

2. Second Process

Figure 15C:
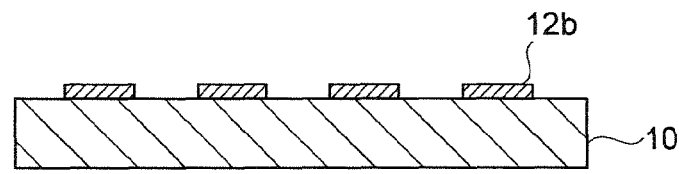

Next, the second process is a process in which a predetermined pattern is formed to the coated film 12 obtained in the first process as shown in FIG. 15C, and to form to a coated film 12b having a predetermined pattern.

Here, as a method for forming a predetermined pattern, a method, for example, but should not be limited to, such as a plasma etching method, a pattern printing process method a lithography method, the mechanical patterning method, or the like, could be used if it is a method of forming a predetermined pattern.

Also, as a predetermined pattern for coated film 12b or metal oxide film 14', various repetition shape patterns such as a line-shaped pattern, an wavy-line linear pattern, a ladder-shaped pattern, a circular pattern, an oval pattern, a triangle pattern, a polygon pattern, a variant pattern, or the like could be used.

(1) Plasma Etching Treatment

It is preferred to form the predetermined pattern by a plasma etching treatment.

That is, it is preferred to appropriately change the following conditions to form a coated film 12b having a predetermined pattern; 1) kinds of plasma generation gas, 2) a temperature of plasma treatment, 3) a plasma pressure, 4) flow of plasma generation gas, and 5) time for a plasma treatment.

More specifically, as conditions for plasma etching treatment, the same conditions could be applied as described in the second process in the first embodiment.

Therefore, as plasma generation gas in case a plasma etching treatment is carried out, it is preferred to use both rare gas and nitrogen gas, or either.

Also, it is preferred that a temperature of a plasma treatment is to be a value within the range of 20 to 100° C.

Also, it is preferred that a plasma pressure is set to be a value within the range of 1 to 500 Pa.

Also, it is preferred that a quantity of plasma generation gas flow is around within 5 mL/min. to 500 mL/min.

Further, it is preferred that the time for a plasma treatment is set to be a value within the range of 10 to 600 seconds.

(2) Method for Pattern Printing

Also, when pattern printing is carried out, it is preferred to use an ink-jet printing method, a silkscreen printing method, a relief printing method (gravure printing method), an offset printing method, or the like.

For example, an ink-jet printing method is a method by which liquid material containing a metal salt is spitted out from a head (projection hole) having piezoelectric element, and is printed on a substrate in a dotted shape.

Also, a silkscreen printing method is a method by which liquid material containing a metal salt extruded from a predetermined print hole, and is printed on a substrate in a predetermined pattern.

Also, a relief printing method is a method in which the relief printing such as gravure roll or the like is prepared, and by which liquid material containing a metal salt is attached to the salient, and is printed on a substrate in a predetermined pattern.

Also, an offset method is a method by which basically using a print roll comprising a hydrophilic part and a lipophilic part, liquid material attached to a hydrophilic part is printed on a substrate in a predetermined pattern.

Further, a metal mask and a ceramic mask having the cavities corresponding to a predetermined pattern is prepared, then through it, liquid material containing a metal salt is printed on a substrate overall, and then the predetermined pattern could be remained and printed by removing a metal mask or a ceramic mask.

(3) Lithography Method

A lithography method is a method in which after stacked on a coated film using a photo resist, predetermined exposure is carried out through a mask corresponding to a predetermined pattern, then after developing, the cavities corresponding to a predetermined pattern is formed at the predetermined location in a light resist, then finally a part of coated film is removed using the cavities.

An extremely fine pattern could be reproducibly obtained by this lithography method.

Note that since liquid material containing a metal salt is soluble in water or alcohol, as an etchant solution, these water and alcohol could be used alone or in combination. Therefore, an etchant solution is an extremely economical and environmental considerate.

(4) Method for Forming a Pattern

A method for forming a mechanical pattern is a method by which a predetermined pattern is formed using blast materials or a brush, or providing the predetermined water pressure and the like, to a predetermined location in a coated film comprising of liquid material containing a metal salt.

3. Second' Process

The second' process is an optional process between the first process and the second process, or the second process and the third process, and in which a coated film is to be partially oxidized by a plasma oxidation treatment or a thermal treatment.

This is because a plasma etching speed of the part where coating thickness is relatively thin, comparatively becomes faster, and plasma etching speed of the part where coating thickness is relatively thick, comparatively becomes slower by partially oxidizing a coated film (Hereinafter, called as etching speed adjustment effect).

Thus, using a metal salt film having such an etching speed adjustment effect as a resist (an etching speed adjustment member), a plasma etching treatment could be carried out to both of a metal salt film and a substrate. Then, the surface irregularity having a fine pattern of even a nanometer order could be stably formed with high accuracy on the substrate.

Note that as a rule of thumb whether or not a partial oxidation is carried out, a change of a chemical element quantity that is detected, for example, by X-rays photoelectron spectroscopic analysis (XPS) may be used. Thereby, the degree of the partial oxidation is determined, and could be adjusted.

That is, it is enabled to determine what level a metal salt film is partially oxidized, by examining how quantitatively changed a metal attributed to a metal salt or the like in the metal salt film is, or how quantitatively changed a specific chemical element except oxygen is, between before and after the second' process (partial oxidation process) by using XPS.

For example, when zinc acetate is used as a metal salt, carbon is regarded as a specific chemical element. Then, when a rate of change is large, it shows that the partial oxidation advanced, while when a rate of change is small adversely, it shows that the partial oxidation does not advanced too much.

More specifically, in the case of example 1, an element quantity of carbon (A) in the metal salt film before the partial oxidation measured in XPS, and an element quantity of carbon (B) in the metal salt film after the partial oxidation are measured. A change of quantity of carbon (=(A−B)/A*100) is calculated, and, from the value of the change, the partial oxidation status in a metal salt film is determined, and it could be adjusted.

Thus it is preferred that a rate of change is set to be a value within the range of 10 to 80% in order to have a excellent partial oxidation status, it is more preferred that a rate of change is set to be a value within the range of 15 to 70%, and much more preferred that a rate of change is set to be a value within the range of 20 to 60%.

(1) Partial Oxidation by a Plasma Treatment

On the occasion of a partial oxidation treatment by a plasma treatment, it is preferred to use a predetermined plasma device, and to use oxygen, argon, helium, fluorocarbons alone or mixed as a plasma source.

Also, as an oxygen source, air, oxygen, water, or the like, or compounds including oxygen could be appropriately used.

Note that it is preferred that at least ion source and a high frequency power source, an upper electrode, a bottom electrode and a ground are equipped, as an example of a plasma device.

Also, it is preferred that a plasma pressure for partial oxidation treatment by a plasma treatment is set to be a value within the range of $1.0 \times 10^{-3}$ to $1.0 \times 10^2$ Pa.

This is because when a pressure is below $1.0 \times 10^{-3}$ Pa, it takes much time to convert to a metal oxide film since a concentration of plasma is too low.

On the other hand, this is because when a plasma pressure is over $1.0 \times 10^2$ Pa, a speed of forming a said film hardly improves since collisions among generated plasma come to easily take place.

Thus, it is preferred that a plasma pressure of a plasma treatment is set to be a value within the range of $1.0 \times 10^{-2}$ to $5.0 \times 10^1$ Pa.

Note that multi-stage plasma oxidation treatment may be carried out. In that case, plasma conditions could be changed at each stage, or plasma oxidation treatment conditions could be carried out in the same conditions plural times.

(2) Partial Oxidation by a Plasma Treatment

On the occasion of partial oxidation treatment by a plasma treatment in the second' process, it is preferred that a temperature of the thermal treatment is set to be a value within the range of 120 to 300° C.

This is because although it depends on a kind of metal salt or a kind of metal complex, there are cases that it may become difficult to oxidize a said metal salt or metal complex, and to form a metal oxide having conductivity, when the temperature of a thermal oxidation treatment is below 120° C.

On the other hand, this is because when the temperature of a thermal oxidation treatment is over 300° C., there are cases that the surface irregularity is deformed by heat, and that a substrate itself is deformed by heat.

Thus, it is more preferred that a temperature of thermal oxidation treatment is set to be a value within the range of 130 to 220° C., and much more preferred that the temperature is set to be a value within the range of 150 to 180° C.

Also, it is preferred that a time for a thermal oxidation treatment is set to be a value within the range of 0.1 to 120 minutes.

This is because although it depends on a kind of metal salt or a kind of metal complex, there are cases that it becomes difficult to oxidize a said metal salt or metal complex, and to form a metal oxide having the predetermined conductivity, when a time for a thermal oxidation treatment is below 0.1 minutes.

On the other hand, this is because when a time for a thermal oxidation treatment is over 120 minutes, there are cases that a surface irregularity is deformed by heat.

Thus, it is more preferred that the time for a thermal oxidation treatment is set to be a value within the range of 1 to 60 minutes, and much more preferred that the time for a thermal oxidation treatment is set to be a value within the range of 5 to 30 minutes.

Note that as oxygen source, air, oxygen gas, or the like could be used. Also, about the embodiment of a thermal oxidation treatment device, there is not a limitation to in particular, and, for example, a burning oven having an electric heating device and infrared heating device could be used.

4. Third Process

Figure 15D:
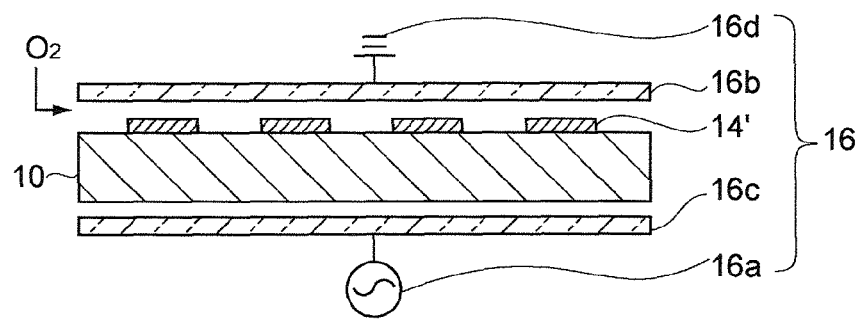
Figure 15E:
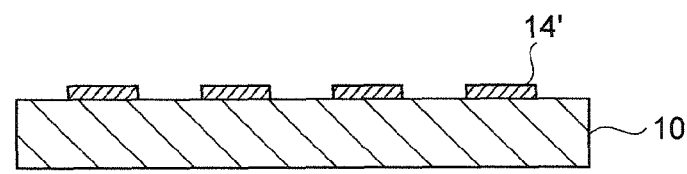

Third process is the process in which a thermal oxidation treatment or a plasma oxidation treatment is carried out to a coated film having a predetermined pattern, and the coated film is converted into a metal oxide film having a predetermined pattern and a predetermined conductivity as well, under the condition of existence of oxygen source as shown in FIG. 15D.

Therefore, this process in the second embodiment basically could be the same as the third process (thermal oxidation treatment process) in the first embodiment.

Note that FIG. 15D shows a case of a thermal oxidation treatment.

5. Fourth Process

As described in the first embodiment, the fourth process is an optional process in which after the third process is carried out, when the metal oxide film obtained in the third process is to be the first conductive layer, the second conductive layer containing a metal or a metal salt is formed on or adjacent to the first conductive layer.

Therefore, the fourth process in the second embodiment could be basically similar to the fourth process described in the first embodiment.

6. Other Processes

As for the second embodiment, it is preferred that neutralization process and washing process, or one of such process are carried out after carrying out a plasma treatment, in the same way as the first embodiment.

7. Embodiment Example

Embodiment examples in the second embodiment mentioned above are the followings. These embodiment examples 7-12 will be specifically described referring to FIG. 15-FIG. 20. Note that the embodiment example is numbered as a consecutive number from embodiment examples in the first embodiment.

Also, A in FIG. 15 to FIG. 20 shows a process for preparing a substrate 10, respectively.

(1) Embodiment Example 7

First process: a coating process
Second process: a process forming a pattern
Third process: an oxidation treatment process by a plasma oxidation treatment FIG. 15B to 15D exemplify from the first process to the third process. By practicing such processes, a metal oxide film 14' having a predetermined pattern and a predetermined conductivity and the like could be stably manufactured as exemplified in FIG. 15E.

Note that since a plasma oxidation treatment is carried out in the third process as shown in FIG. 15D, the treatment is enabled be carried out at low temperature, with the result that thermal damage on substrate 10 and the like are effectively avoidable.

(2) Embodiment Example 8

Figure 16A:
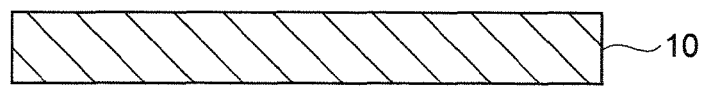
FIG. 16A-16E are figures to offer to describe a method for forming a metal oxide film of the present invention (embodiment example 8).
Figure 16B:
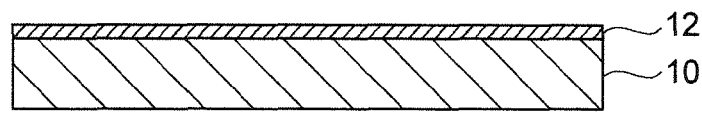
Figure 16C:
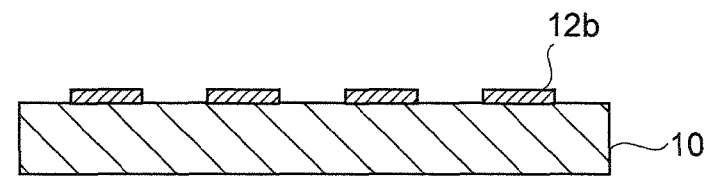
Figure 16D:
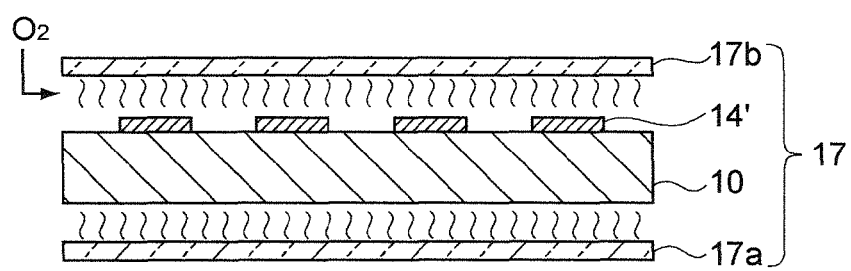
Figure 16E:
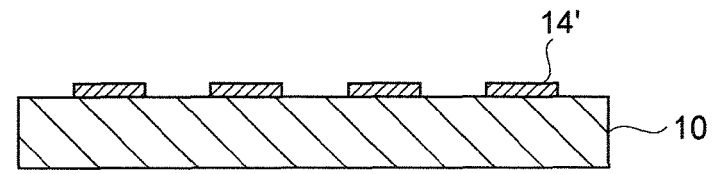

First process: a coating process
Second process: a process forming a pattern
Third process: an oxidation treatment process by a thermal oxidation treatment FIG. 16B to 16D exemplify from the first process to the third process. By practicing such processes, a metal oxide film 14' having a predetermined pattern and predetermined conductivity and the like could be stably manufactured as exemplified in FIG. 16E.

Also, since the thermal oxidation treatment is carried out in the third process as shown in FIG. 16D, a large quantity of oxidation treatment, using for example, a heating furnace 17 (17a, 17b), is enabled to be carried out, which is very economical.

(3) Embodiment Example 9

Figure 17A:
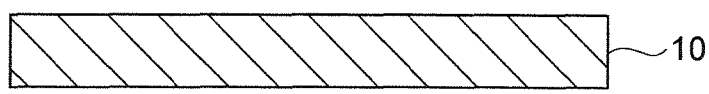
FIG. 17A-17D are figures to offer to describe a method for forming a metal oxide film of the present invention (embodiment example 9).
Figure 17B:
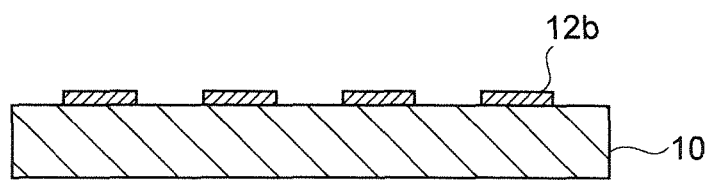
Figure 17C:
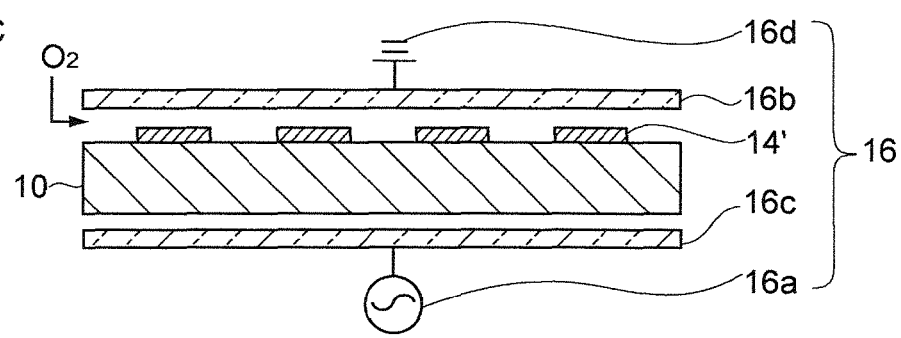
Figure 17D:
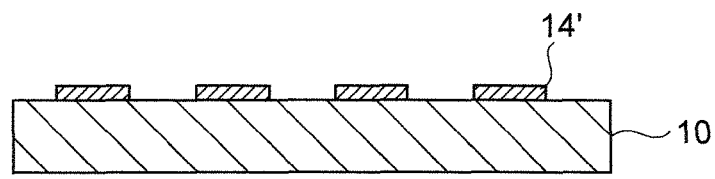

First process and second process: a pattern coating process
Third process: an oxidation treatment process by a plasma oxidation treatment FIG. 17B to 17D exemplify from the first process and second process (combined one process) to the third process.

By practicing such processes, a metal oxide film 14' having a predetermined pattern and predetermined conductivity and the like could be quickly and stably manufactured as exemplified in FIG. 17D.

Also, as shown in FIG. 17B, since the first process and the second process are carried out at the same time, a metal oxide film 14' having a predetermined pattern and a predetermined conductivity and the like, could be quickly and economically manufactured.

Further, since the plasma treatment carried out in the third process as shown in FIG. 17C, the treatment is enabled to be carried out at low temperature, with the result that thermal damage on substrate 10 are effectively avoidable.

(4) Embodiment Example 10

Figure 18A:
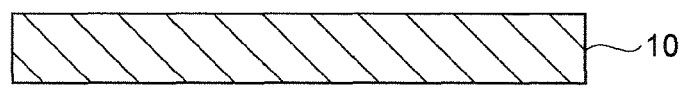
FIG. 18A-18D are figures to offer to describe a method for forming a metal oxide film of the present invention (embodiment example 10).
Figure 18B:
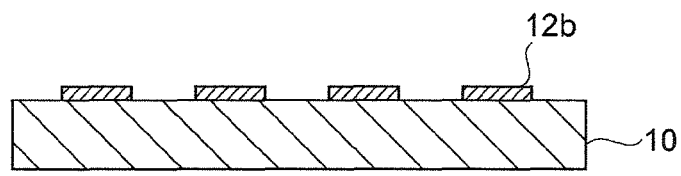
Figure 18C:
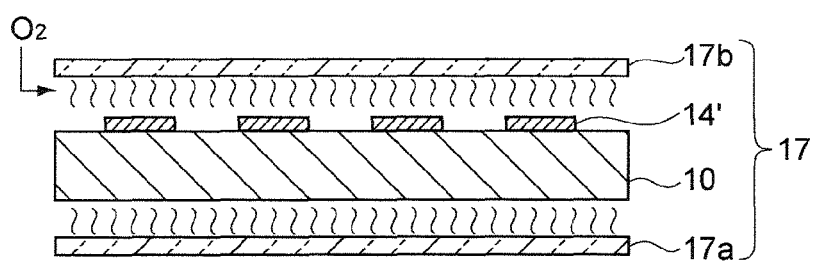
Figure 18D:
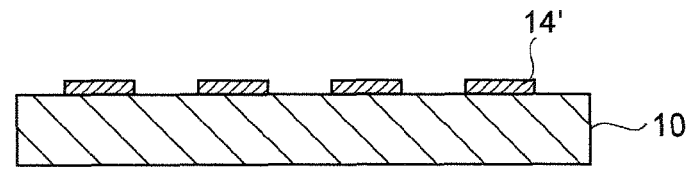

First process and second process: a pattern coating process
Third process: an oxidation treatment process by a thermal oxidation treatment FIG. 18B to 18D exemplify from the first process and second process (combined one process) to the third process. By practicing such processes, a metal oxide film 14' having a predetermined pattern and a predetermined conductivity and the like as well, could be quickly and stably manufactured as exemplified in FIG. 18D.

Also, as shown in FIG. 18B, since the first process and the second process are carried out at the same time, a metal oxide film 14' having a predetermined pattern could be quickly and economically manufactured.

Also, since the thermal oxidation treatment is carried out in the third process as shown in FIG. 18C, a large quantity of oxidation treatment, using for example, a heating furnace 17 (17a, 17b), is enabled to be carried out, which is very economical.

(5) Embodiment Example 11

Figure 19A:
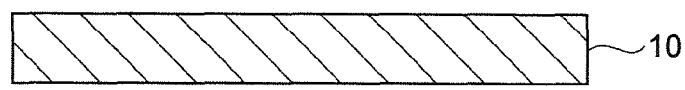
FIG. 19A-19E are figures to offer to describe a method for forming a metal oxide film of the present invention (embodiment example 11).
Figure 19B:
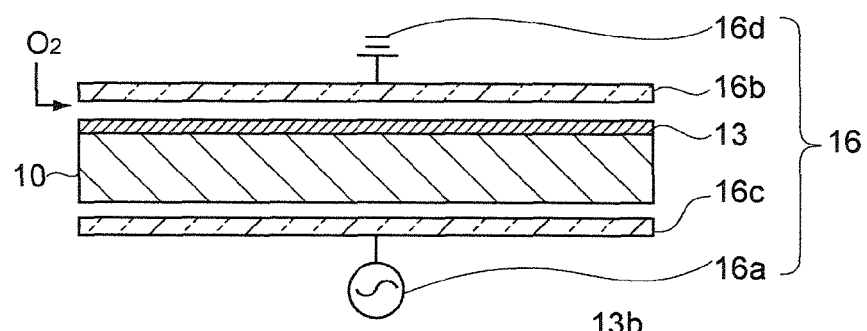
Figure 19C:
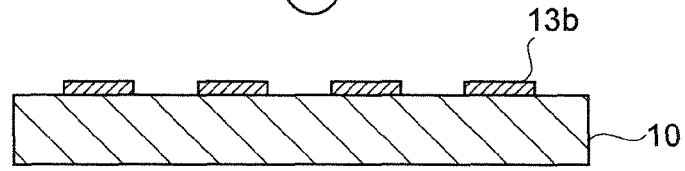
Figure 19D:
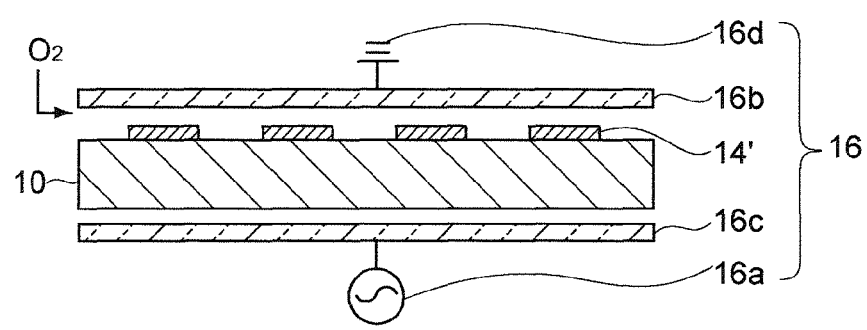
Figure 19E:
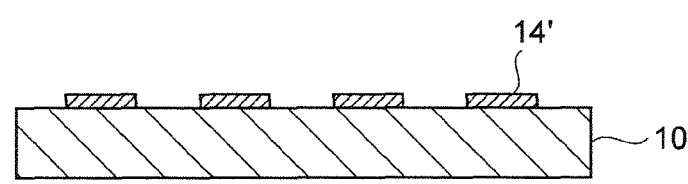

First process: a coating process (not shown in figures)
Second' process: a partial oxidation process by a plasma oxidation treatment
Second process: a process forming a pattern
Third process: an oxidation treatment process by a plasma oxidation treatment FIG. 19B to 19D exemplify from the second' process to the third process. By practicing such processes, a metal oxide film 14' having a specific pattern and a conductivity and the like, could be stably manufactured as exemplified in FIG. 19E.

Also, since the second' process is provided for a partial oxidation process, a process speed for forming a pattern could be adjusted in the next process (the second process) as shown in FIG. 19B.

Further, since the plasma oxidation treatment carried out in the third process as shown in FIG. 19D, the treatment is enabled to be carried out at low temperature, with the result that thermal damage on substrate 10 are effectively avoidable.

(6) Embodiment Example 12

Figure 20A:
FIG. 20A-20E are figures to offer to describe a method for forming a metal oxide film of the present invention (embodiment example 12).
Figure 20B:
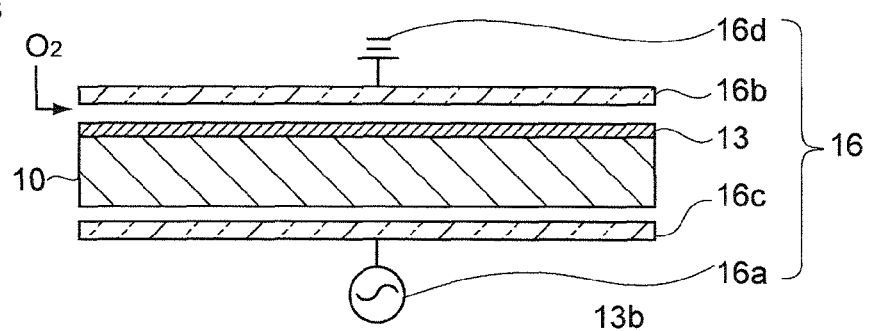
Figure 20C:
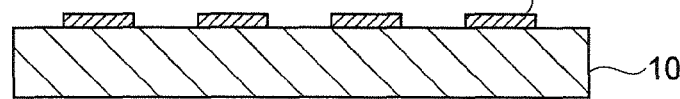
Figure 20D:
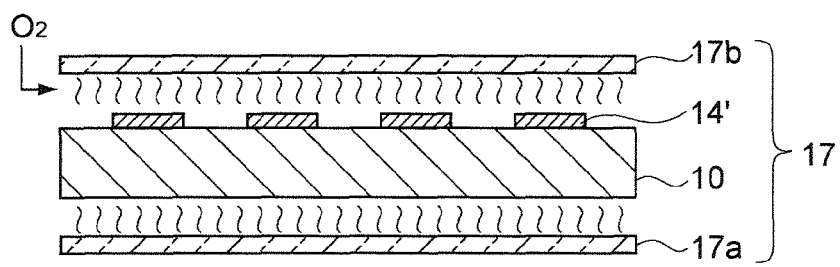
Figure 20E:
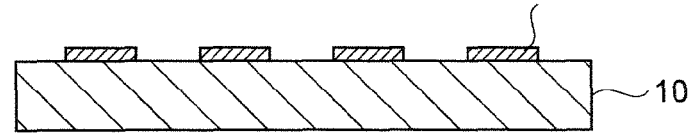

First process: a coating process (not shown in figures)
Second' process: a partial oxidation process by a plasma oxidation treatment
Second process: a process forming a pattern
Third process: an oxidation treatment process by a thermal oxidation treatment FIG. 20B to 20D exemplify from the second' process to the third process. By practicing such processes, a metal oxide film 14' having a predetermined pattern and a conductivity and the like, could be stably manufactured as exemplified in FIG. 20E.

Also, since the second' process is provided for a partial oxidation process, a process speed for forming a pattern could be adjusted in the next process (the second process) as shown in FIG. 20B.

Further, since the thermal oxidation treatment is carried out in the third process as shown in FIG. 20D, a large quantity of oxidation treatment, using for example, a heating furnace 17 (17a, 17b), is enabled to be carried out, which is very economical.

THIRD EMBODIMENT

The third embodiment is a method for forming a metal oxide film, which combines both of the first embodiment and the second embodiment regarding the method for forming a metal oxide film, and which forms a metal oxide film having a pattern on a substrate. Namely, the method for forming a metal oxide film according to the third embodiment is characterized in comprising the first process to third process as mentioned below.

(1) the first process in which a liquid material containing both a metal salt and a metal complex or either of these is coated on a substrate to form a coated film.

(2) the second process in which a surface irregularity and a predetermined pattern are formed to the coated film.

(3) the third process in which the coated film having a surface irregularity and a formed predetermined pattern is converted into a metal oxide film having a surface irregularity and a predetermined pattern by a thermal oxidation treatment or plasma oxidation treatment under the condition of existence of an oxygen source.

These embodiment examples 13 to 18 will be specifically described referring to FIG. 21 to FIG. 26 as follows. Note that the embodiment example is numbered as a consecutive number from embodiment examples in the first embodiment and the second embodiment.

Also, A in FIG. 21 to FIG. 26 shows a process for preparing a substrate 10, respectively.

(1) Embodiment Example 13

First process: a coating process
Second process-1: a process forming a pattern
Second process-2: a process forming a surface irregularity by a plasma etching treatment
Third process: an oxidation treatment process by a plasma oxidation treatment FIG. 21B to 21E exemplify from the first process to the third process. By practicing such processes, a metal oxide film 14' having a surface irregularity 14'a and a predetermined pattern as well, is stably manufactured as exemplified in FIG. 21F.

Figure 21A:
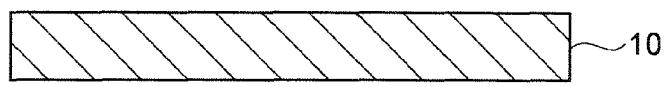
FIG. 21A-21F are figures to offer to describe a method for forming a metal oxide film of the present invention (embodiment example 13).
Figure 21B:
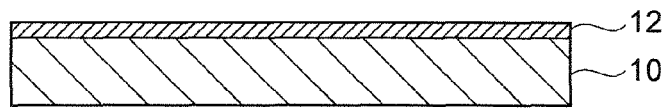
Figure 21C:
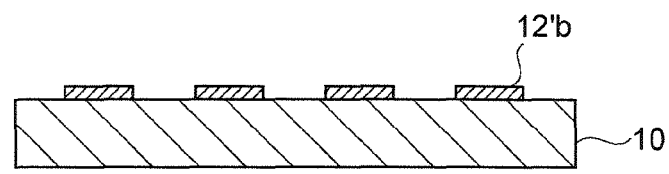
Figure 21D:
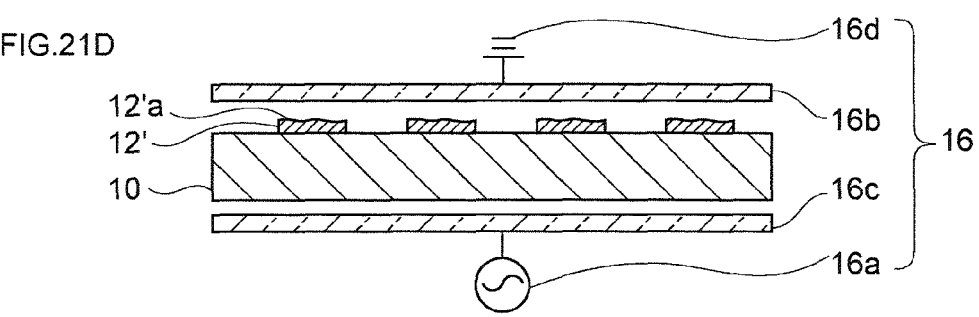

Also, since a process forming a pattern is formerly carried out as shown in FIG. 21C, and since a process forming a surface irregularity (a plasma etching treatment) is subsequently carried out as shown in FIG. 21D, it is enabled to form a pattern with high accuracy.

Figure 21E:
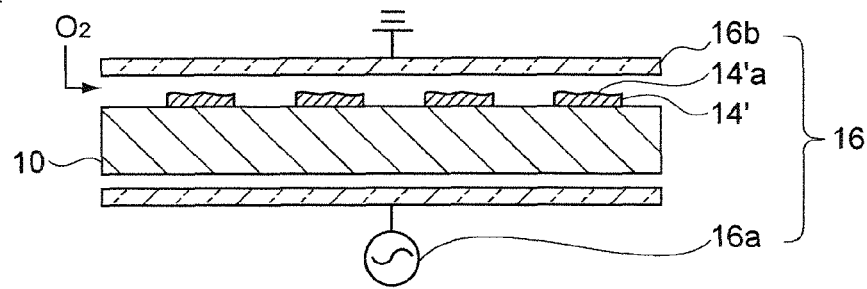
Figure 21F:
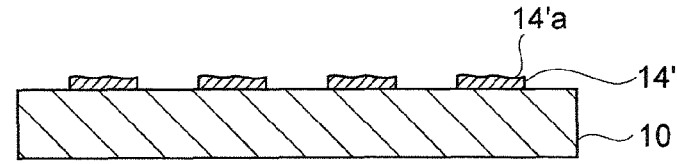

Also, since plasma treatments from the second process-2 to third process are enabled to successively carry out in a same chamber as shown in FIG. 21D to 21E, it is extremely economical as a whole.

Further, since a plasma oxidation treatment is carried out in the third process as shown in FIG. 21E, the treatment is enabled to be carried out at low temperature, with the result that thermal damage on substrate 10 and the like are effectively avoidable.

(2) Embodiment Example 14

First process: a coating process
Second process-1: a process forming a surface irregularity by a plasma etching treatment
Second process-2: a process forming a pattern
Third process: an oxidation treatment process by a plasma oxidation treatment FIG. 22B to 22E exemplify from the first process to the third process. By practicing such processes, a metal oxide film 14' having a surface irregularity 14'a and a predetermined pattern as well is stably manufactured as exemplified in FIG. 22F.

Figure 22A:
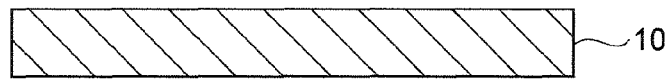
FIG. 22A-22F are figures to offer to describe a method for forming a metal oxide film of the present invention (embodiment example 14).
Figure 22B:
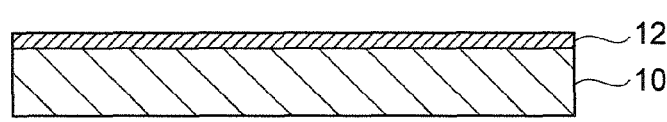
Figure 22C:
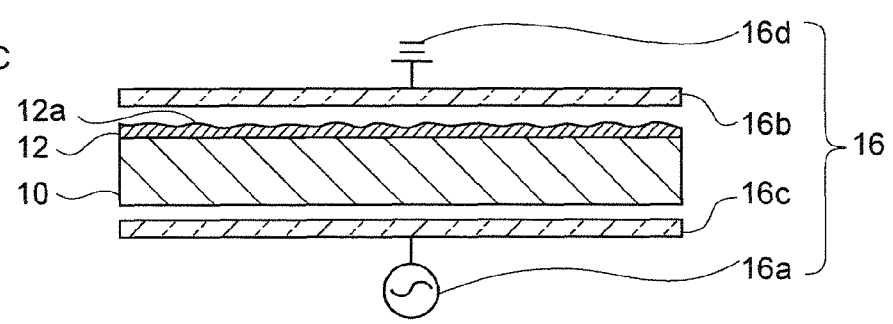
Figure 22D:
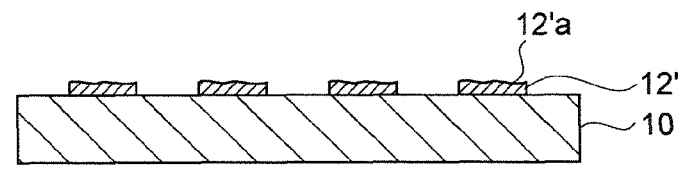

Also, since a process for forming a surface irregularity (a plasma etching treatment) is formerly carried out as shown in FIG. 22C, and since a process for forming a pattern is subsequently carried out as shown in FIG. 22D, it is enabled to form the surface irregularity with high accuracy.

Figure 22E:
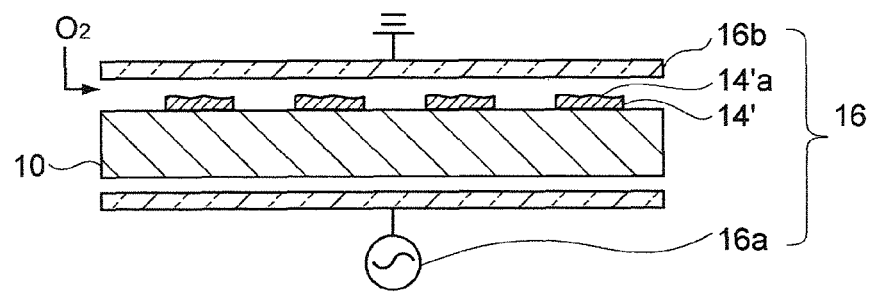
Figure 22F:
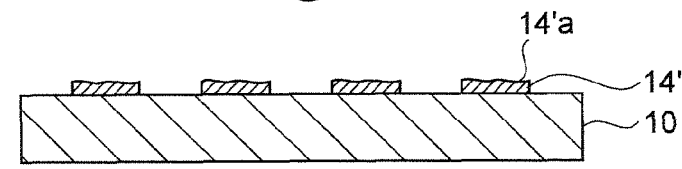

Further, since a plasma oxidation treatment is carried out in the third process as shown in FIG. 22E, the treatment is enabled to be carried out at low temperature, with the result that thermal damage on substrate 10 and the like are effectively avoidable.

(3) Embodiment Example 15

First process: a coating process
Second process-1: a process forming a pattern
Second process-2: a process forming a surface irregularity by a plasma etching treatment
Third process: an oxidation treatment process by a thermal oxidation treatment FIG. 23B to 23E exemplify from the first process to the third process. By practicing such processes, a metal oxide film 14' having a surface irregularity 14'a and a predetermined pattern as well is stably manufactured as exemplified in FIG. 23F.

Figure 23A:
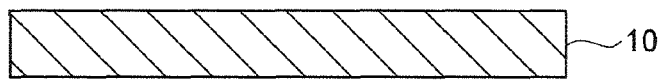
FIG. 23A-23F are figures to offer to describe a method for forming a metal oxide film of the present invention (embodiment example 15).
Figure 23B:
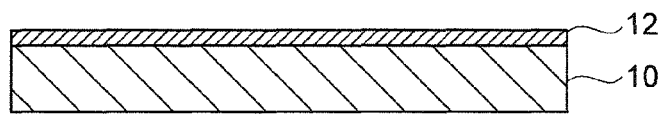
Figure 23C:
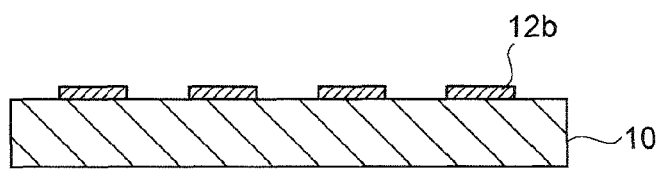
Figure 23D:
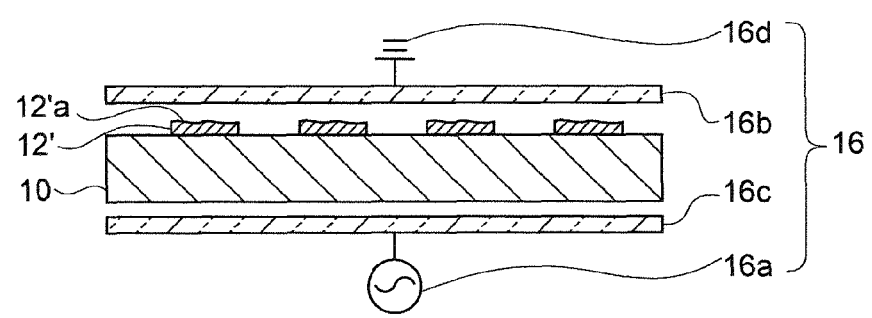

Also, since a process forming a pattern is formerly carried out as shown in FIG. 23C, and since a process forming a surface irregularity (a plasma etching treatment) is subsequently carried out as shown in FIG. 23D, it is enabled to form a pattern with high accuracy.

Figure 23E:
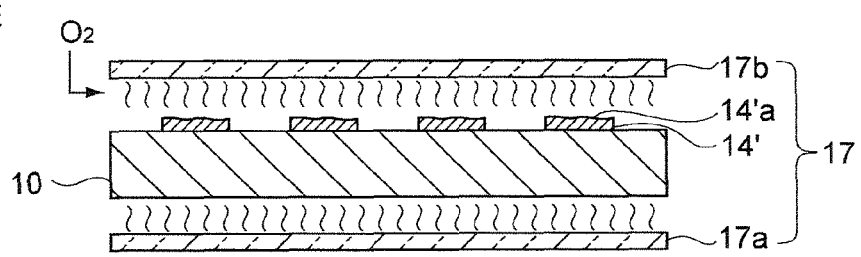
Figure 23F:
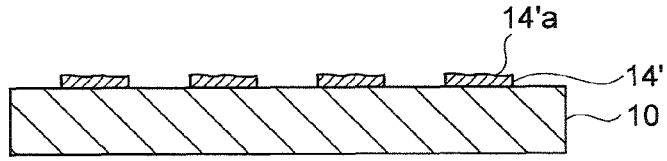

Further, since the thermal oxidation treatment is carried out in the third process as shown in FIG. 23E, a large quantity of oxidation treatment, using for example, a heating furnace 17 (17a, 17b), is enabled to be carried out, which is very economical.

(4) Embodiment Example 16

First process: a coating process
Second process-1: a process forming a surface irregularity by a plasma etching treatment
Second process-2: a process forming a pattern
Third process: an oxidation treatment process by a thermal oxidation treatment FIG. 24B to 24E exemplify from the first process to the third process. By practicing such processes, a metal oxide film 14' having a surface irregularity 14'a and a predetermined pattern as well is stably manufactured as exemplified in FIG. 24F.

Figure 24A:
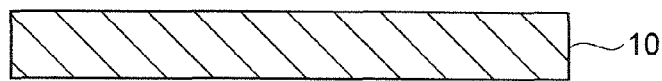
FIG. 24A-24F are figures to offer to describe a method for forming a metal oxide film of the present invention (embodiment example 16).
Figure 24B:
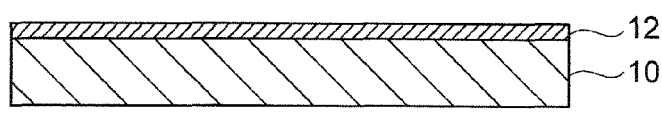
Figure 24C:
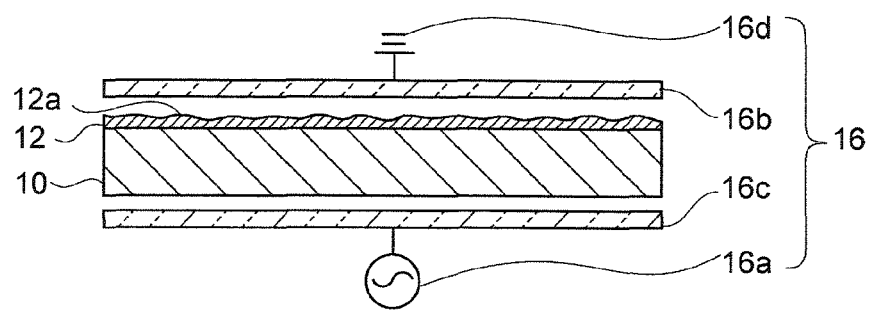
Figure 24D:
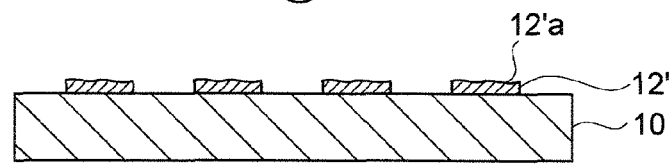

Also, since a process forming a surface irregularity (a plasma etching treatment) is formerly carried out as shown in FIG. 24C, and since a process forming a pattern is subsequently carried out as shown in FIG. 24D, it is enabled to form a surface irregularity with high accuracy.

Figure 24E:
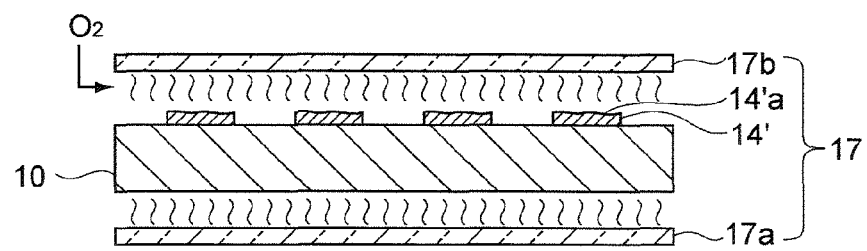
Figure 24F:
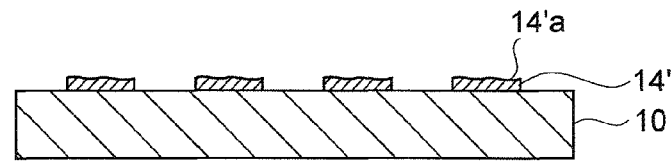

Further, since the thermal oxidation treatment is carried out in the third process as shown in FIG. 24E, a large quantity of oxidation treatment, using for example, a heating furnace 17 (17a, 17b), is enabled to be carried out, which is very economical.

(5) Embodiment Example 17

Figure 25A:
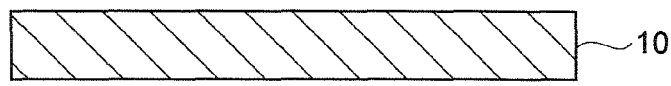
FIG. 25A-25E are figures to offer to describe a method of forming a metal oxide film of the present invention (embodiment example 17).
Figure 25B:
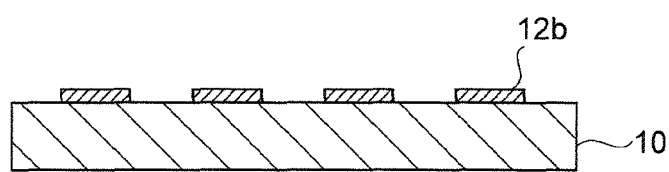
Figure 25C:
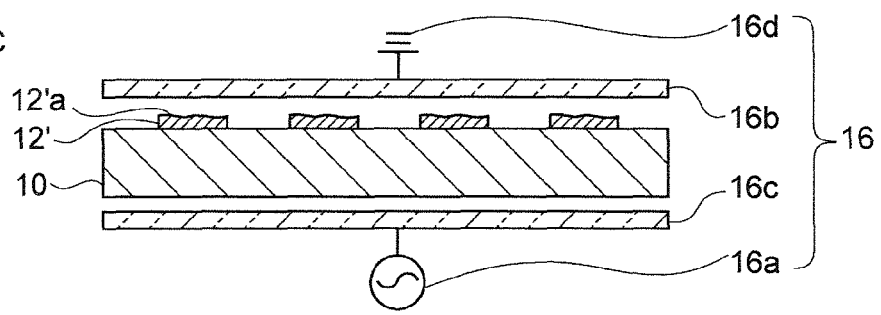
Figure 25D:
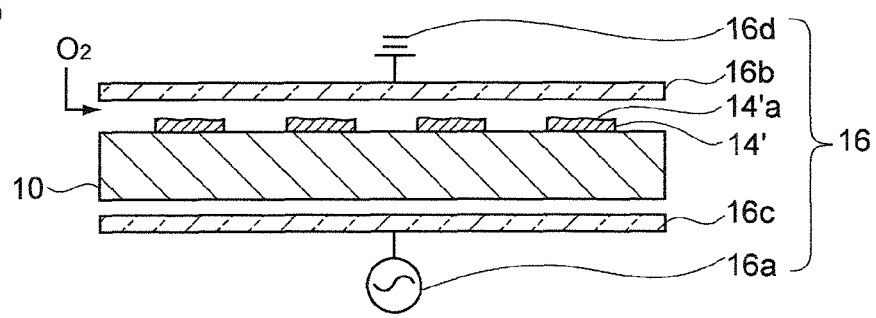
Figure 25E:
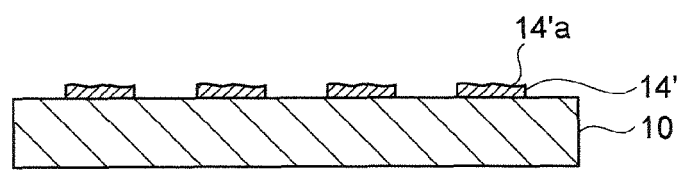

First process and Second process-1: a pattern coating process
Second process-2: a process forming a surface irregularity by a plasma etching treatment
Third process: an oxidation treatment process by a plasma oxidation treatment FIG. 25B to 25D exemplify from the first process to the third process. By practicing such processes, a metal oxide film 14' having a surface irregularity 14'a and a predetermined pattern as well is quickly and stably manufactured as exemplified in FIG. 25E.

Also, since the first process and second process-1 are carried out at the same time as shown in FIG. 25B, a metal oxide film having a predetermined pattern could be quickly and economically manufactured.

Also, since plasma treatments from the second process to third process are enabled to be successively carried out in a same chamber as shown in FIG. 25C to 25D, it is extremely economical as a whole.

Further, since a oxidation treatment is carried out in the third process as shown in FIG. 25D, the treatment is enabled to be carried out at low temperature, with the result that thermal damage on substrate 10 and the like are effectively avoidable.

(6) Embodiment Example 18

Figure 26A:
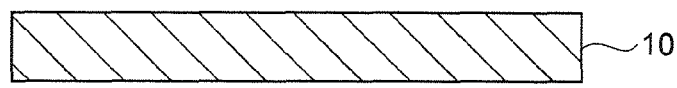
FIG. 26A-26E are figures to offer to describe a method for forming a metal oxide film of the present invention (embodiment example 18).
Figure 26B:
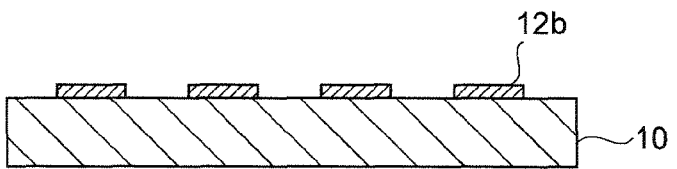
Figure 26C:
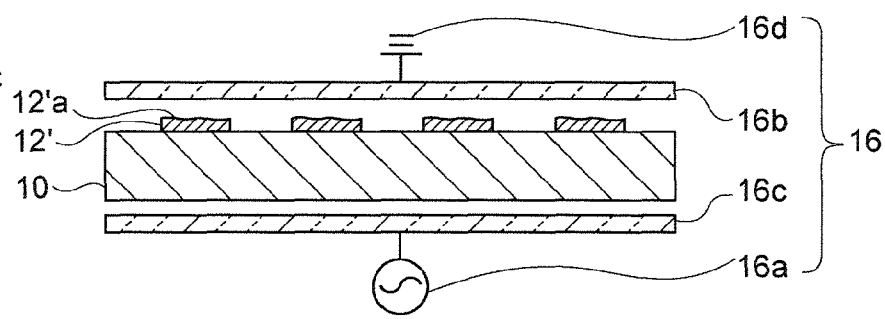
Figure 26D:
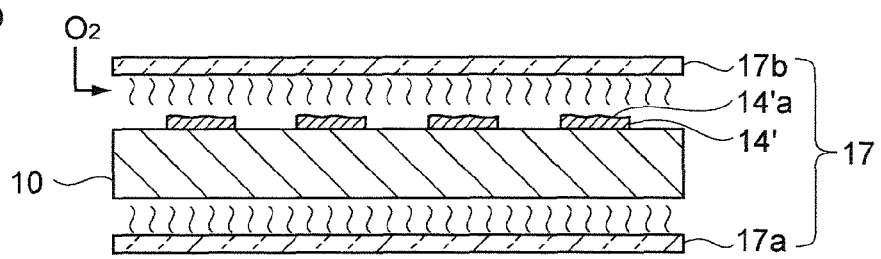
Figure 26E:
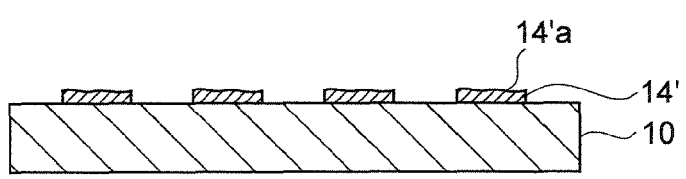
Figure 27A:
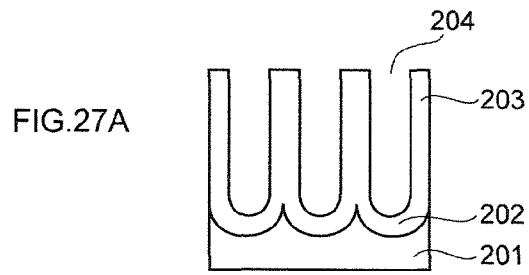
FIG. 27A-27F are figures to offer to describe a manufacturing method for the conventional porous material.
Figure 27B:
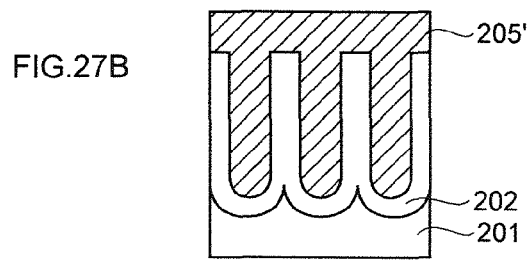
Figure 27C:
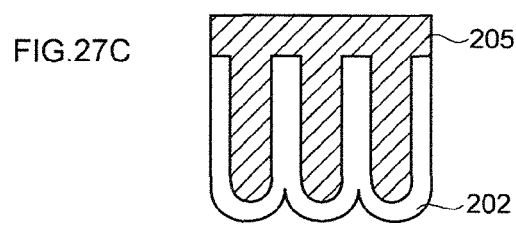
Figure 27D:
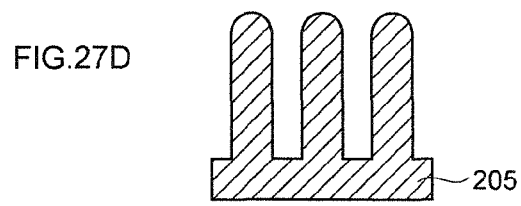
Figure 27E:
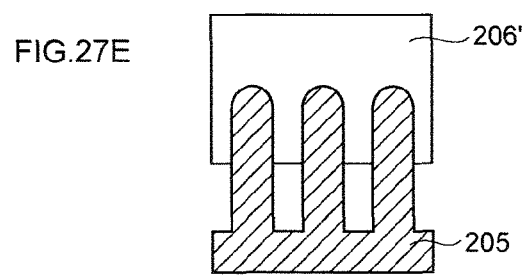
Figure 27F:
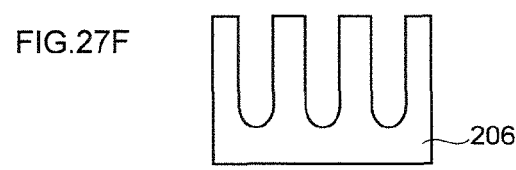

First process and Second process-1: a pattern coating process
Second process-2: a process forming a surface irregularity by a plasma etching treatment
Third process: an oxidation treatment process by a thermal oxidation treatment FIG. 26B to 26D exemplify from the first process to the third process. By practicing such processes, a metal oxide film 14' having a surface irregularity 14'a and a predetermined pattern as well is quickly and stably manufactured as exemplified in FIG. 26E.

Also, since the first process and second process-1 are carried out at the same time as shown in FIG. 26B, a metal oxide film having a predetermined pattern could be quickly and economically manufactured.

Further, since the thermal oxidation treatment is carried out in the third process as shown in FIG. 26D, a large quantity of oxidation treatment, using for example, a heating furnace 17 (17a, 17b), is enabled to be carried out, which is very economical.

FOURTH EMBODIMENT

The fourth embodiment is a method for forming a metal oxide film 14 having a surface irregularity 14a which is formed by any method for forming a metal oxide film in the first embodiment to third embodiment, and which is characterized in that the surface specific resistance of the metal oxide film 14 is set to be a value within the range of $1\times10^0$ to $1\times10^{10}\Omega/\square$ as exemplified in FIG. 1D.

1. Surface Irregularity

It is characterized that a metal oxide film has the surface irregularity. Namely, it is preferred that a surface roughness of the surface irregularity of a metal oxide film is, as mentioned above, over nm, and more preferred that a surface roughness of the surface irregularity is set to be a value within the range of 40 to 500 nm, and much more preferred that a surface roughness of the surface irregularity is set to be a value within the range of 45 to 300 nm.

2. Thickness

It is preferred that a thickness of a metal oxide film of the present invention is set to be a value within the range of 50 to 1000 nm.

This is because when a thickness of a metal oxide film is below 50 nm, there are cases that mechanical strength decreases, durability and adhesion significantly declines and a surface specific resistance of metal oxide film becomes excessively large.

On the other hand, this is because when a thickness of a metal oxide film is over 1000 nm, there are cases that it takes much time to form a metal oxide film and light transmittance significantly decreases.

Therefore, it is more preferred that a thickness of a metal oxide film is set to be a value within the range of 80 to 800 nm, and much more preferred that a thickness of a metal oxide film is set to be a value within the range of 100 to 600 nm.

3. Surface Specific Resistance

Also, the surface specific resistance of metal oxide film in the present embodiment is set to be a value within the range of $1\times10^0$ to $1\times10^{10}\Omega/\square$.

This is because when the surface specific resistance of this metal oxide film is over $1\times10^{10}\Omega/\square$, there are cases that conductivity significantly decreases and available applications are excessively limited.

On the other hand, this is because it may be difficult to manufacture a metal oxide film having the surface specific resistance of below $1\times10^0\Omega/\square$.

Therefore, it is more preferred that the surface specific resistance of a metal oxide film is set to be a value within the range of $3\times10^0$ to $1\times10^9\Omega/\square$, and much more preferred that the surface specific resistance is set to be a value within the range of $5\times10^0$ to $1\times10^8\Omega/\square$.

Note that a method for measuring the surface specific resistance of metal oxide film will be described in detail in examples as mentioned later.

4. Light Transmittance

Also, it is preferred that the visible light transmittance of a metal oxide film of the present invention is a value equal to or over 50%.

This is because when the light transmittance of a metal oxide film is below 50%, there are cases that it is difficult to use as a transparent electrode and available applications are excessively limited. On the other hand, this is because an upper limit of visible light transmittance is around 95% although the upper limit depends on the metal oxide film. Therefore it is preferred that the visible light transmittance of a metal oxide film is set to be a value within the range of 60% to 95%, and much more preferred that the light transmittance is set to be a value within the range of 70% to 90%.

Note that visible light transmittance is the light transmittance in wavelength 550 nm, and a method for measuring the light transmittance will be described in detail in examples mentioned later.

5. Protective Layer

Figure 2C:
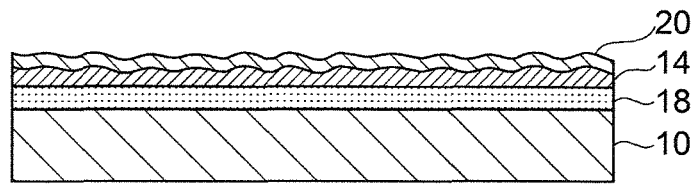

Also, a protective layer 20 could be formed above a metal oxide film 14 as shown in FIG. 2C.

For example, when a metal oxide film has such a protective layer, damages to the metal oxide film could be prevented.

Note that as materials comprising a protective layer, for example, a thermosetting resin, a photopolymer or a thermoplastic resin could be used.

6. Patterning

Figure 2D:
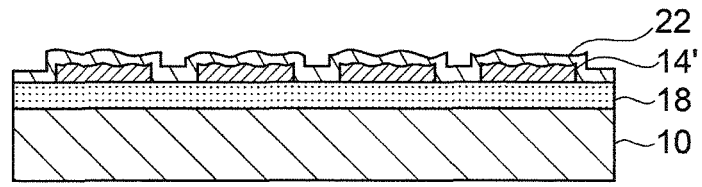

Also, it is preferred to pattern to a metal oxide film 14 as shown in FIG. 2D.

For example, the metal oxide film 14' carried out such a patterning could be suitably used as an electrode of a liquid crystal display device, a plasma display device, an organic electroluminescence device or an inorganic electroluminescence device.

Note that an example shown in FIG. 2D represents that a resin layer 22 comprising an electrically insulating layer, a color filter, or the like is further formed on a metal oxide film 14' carried out a patterning.

7. Applications

Also, as for forming a metal oxide film, it is preferred that the metal oxide film is an electrode of an electronic device.

This is because since the metal oxide film of the present invention has a low surface specific resistance and a predetermined surface irregularity, an electronic device could be effectively driven when it is configured as an electrode of an electronic device. Particularly, when the metal oxide film is used as an electrode for solar batteries of an electronic device, conversion efficiency will improve because contact areas with an adjacent semiconductor layer increases.

Also, since a metal oxide film of the present invention has high transparency, it could effectively permeate required light.

Note that a kind of electronic devices includes a liquid crystal display device, an organic electroluminescence device, an organic thin film solar battery, a pigment sensitization type solar battery, an organic transistor, a plasma display, and the like.

EXAMPLE

Example 1

1. Forming of Metal Oxide Film
(1) First Process 0.2 g of zinc acetate as a metal salt (made by Aldrich, purity 99.99%) and 30 g of pure water were poured into a container having a stirring device, and they were uniformly stirred and mixed to be the liquid material containing a metal salt (its concentration is 41.7 mmol/L).

Next, the obtained liquid material containing a metal salt was coated on a surface of glass substrate of 700 μm in thickness (EAGLE 2000, made by Corning Incorporated) by a spin coating method (rotation speed 1500 rpm), and then was dried at 100° C. for five minutes. Thus, a zinc acetate film (metal salt film) of 500 nm in thickness was obtained.

(2) Second Process

Next, by using a plasma device (PDC-210, made by Yamato Material Co. Ltd.), the coated surface was plasma-treated under the following conditions. Thus, surface roughness as a center line average surface roughness (Ra) of 89.4 nm was formed on the zinc acetate film.

RF electric power (frequency 13.56 MHz): 300 W
Plasma generation gas: Ar
Gas flow rate: 50 mL/min.
Plasma pressure: 45 Pa
time for a plasma treatment: 3 min.
Temperature of the plasma treatment: 55° C.

(3) Third Process

Next, the obtained glass substrate having the zinc acetate film with a surface irregularity was heated at 500° C. for 30 minutes in the air using a calcination oven, and the zinc acetate film was converted to the metal oxide film (zinc oxide) by thermal oxidation treatment.

Lastly, the glass substrate having the metal oxide film was washed by water at 25° C. for 30 minutes, and the glass substrate having the metal oxide film with irregularity which a center line average surface roughness (Ra) is 89.4 nm was formed.

2. Evaluation of Metal Oxide Film

The following evaluations were carried out for samples of the metal oxide film obtained above. The obtained results are shown in Table 1.

(1) Center Line Average Roughness (Ra)

A center line average roughness (Ra) was measured by using an atomic force microscope (SPA300HV made by SII NanoTechnology Inc.).

That is, the surface (measuring area: 5 μm×5 μm) was observed using an atomic force microscope with DFM mode (dynamic force mode) and with the scan frequency of 0.3 Hz. Then, a center line average roughness (Ra) was calculated by applying the above measurement data to formula (1) mentioned above.

(2) Surface Specific Resistance

A surface specific resistance (Ω/□) of the metal oxide film was measured by a four-terminal method using a resistance measuring instrument (Lorester MCP-T6 made by Mitsubishi Chemical Corporation).

(3) Observation of a Shape of a Surface Irregularity

Pictures of the surface shape were taken by using an atomic force microscope (S-470 made by Hitachi High Technologies Co., LTD) and the surface irregularity shape was confirmed.

(4) Oxygen Content

In order to verify that the expected metal oxide film was formed, metal oxide film composition ratio was measured under the following condition by using a X-rays photoelectron spectroscopic analysis (an XPS analysis using Quantera SXM made by ULVAC-PHI, Incorporated).

A proportion of oxygen was defined as oxygen content (mol %) of a metal oxide film.

Exciting X rays: Ar
X-ray size: 100 μm
X-ray output: 15 kV, 25 W
Photoelectron escape angle: 45 degrees (5) Light Transmittance A visible light transmittance (wavelength 550 nm) of the metal oxide film on the condition that a substrate was included, was measured by using ultraviolet and visible spectrophotometer of (UV-3101PC, made by Shimadzu Corporation).

(6) Adhesion

Adhesion of the metal oxide film on a substrate was evaluated by a cross cut test (JIS K-5600-5-6).

Note that an evaluation criteria followed in accordance with testing result classifications in accordance with JIS K-5600-5-6.

Class 0: No peeling in every lattice frame.
Class 1: Small film peelings at intersections of cutting.
Class 2: films are peeled along cutting edges or are peeled at intersections. Over 5% and equals to or below 15% of cross cutting areas are influenced.
Class 3: films are partially or extensively peeled along cutting edges or partially or extensively peeled at various parts of lattice frames. Over 15% and equals to or below 35% of cross cutting areas are influenced.
Class 4: films are partially or extensively peeled along cutting edges or partially or extensively peeled at several lattice frames. Over 35% and equals to or below 65% of cross cutting areas are influenced.
Class 5: peeling level surpassing class 4.

Example 2

In example 2, a metal oxide film (zinc oxide) was formed and evaluated in the same way as example 1, except that the plasma pressure was 30 Pa in the second process. Table 1 shows the experimental results.

Example 3

In example 3, a metal oxide film (zinc oxide) was formed and evaluated in the same way as example 1, except that the plasma pressure was 70 Pa in the second process. Table 1 shows the experimental results.

Example 4

In example 4, a metal oxide film (zinc oxide) was formed and evaluated in the same way as example 1, except that the plasma pressure was 90 Pa in the second process. Table 1 shows the experimental results.

Example 5

In example 5, a metal oxide film (zinc oxide) was formed and evaluated in the same way as example 1, except that zinc acetylacetonate (made by Aldrich company, purity 99.99%) as metal complex was used instead of a metal salt in the first process, and was dissolve in methanol. Table 1 shows the experimental results.

Example 6

In example 6, a metal oxide film (zinc oxide) was formed and evaluated in the same way as example 5, except that in addition to using gallium(III) acetylacetonato (made by Aldrich company, purity 99.99%) as dopant precursor, the concentration of the said dopant precursor was set up so that 96 mol of zinc in zinc acetylacetonate as metal complex was mixed with 4 mol of gallium. Table 1 shows the experimental results.

Example 7

In example 7, a metal oxide film (zinc oxide) was formed and evaluated in the same way as example 5, except that in addition to using aluminum acetylacetonato (made by Aldrich company, purity 99%) as dopant precursor, the concentration of the said dopant precursor was set up so that 96 mol of zinc in zinc acetylacetonate as metal complex was mixed with 4 mol of aluminum. Table 1 shows the experimental results.

Example 8

In example 8, a metal oxide film (indium oxide) was formed and evaluated in the same way as example 5, except that indium(III) acetylacetonato (made by Aldrich company, purity 99.99%) as a metal complex was used. Table 1 shows the experimental results.

Example 9

In example 9, a metal oxide film (ITO) was formed and evaluated in the same way as example 8, except that in addition to using tin(II) acetylacetonato (made by Wako Pure Chemical Industries, Ltd., purity 99%) as dopant precursor, the concentration of the said dopant precursor was set up so that indium(III) acetylacetonate having 96 mol of indium was mixed with 4 mol of tin. Table 1 shows the experimental results.

Example 10

In example 10, a metal oxide film (titanium oxide) was formed and evaluated in the same way as example 5, except that titanium oxide (IV) acetylacetonato (made by Aldrich company, purity 99.9%) was used as metal complex. Table 1 shows the experimental results.

Example 11

In example 11, a metal oxide film (zinc oxide) was formed and evaluated in the same way as example 1, except that helium was used as plasma generation gas. Table 1 shows the experimental results.

Example 12

In example 12, a metal oxide film (zinc oxide) was formed and evaluated in the same way as example 1, except that krypton was used as plasma generation gas. Table 1 shows the experimental results.

Example 13

In example 13, a metal oxide film (zinc oxide) was formed and evaluated in the same way as example 1, except that nitrogen was used as plasma generation gas. Table 1 shows the experimental results.

Example 14

In example 14, a metal oxide film was formed and evaluated based on example 1, except that the following plasma oxidation treatment was carried out in the third process, instead of a thermal oxidation treatment. Table 1 shows the experimental results.
(1) First Process
A Polyethylene-telephthalate (PET) film of 180 μm in thickness (A-4300, made by Toyobo Co., LTD.) was prepared and coated with poly vinyl alcohol (made by Kanto Chemical Co., INC., the weight average molecular weight 86,000) by a spin coating method so that the thickness was 0.2 μm, and then it was dried to form a PET substrate having a primer layer of poly vinyl alcohol.
On the other hand, 0.2 g of zinc acetate (made by Aldrich company, purity 99.99%) and 30 g of pure water were poured into a container having a stirring device, and they were uniformly stirred and mixed to be liquid material containing a metal salt (concentration is 41.7 mmol/L).
Next, the obtained liquid material containing a metal salt was coated on a surface of the PET substrate by a spin coating method (rotation speed 1500 rpm), and then it was dried at 100° C. for five minutes to form a zinc acetate film of 500 nm in thickness.
(2) Second Process
Next, by using a plasma device (PDC-210, made by Yamato Material Co. Ltd.), the coated surface was plasma-treated under the following condition to form surface roughness as a center line average surface roughness (Ra) of 85.8 nm on the zinc acetate film surface.
RF electric power (frequency 13.56 MHz): 300 W
Plasma generation gas: Ar
Gas flow rate: 50 mL/min.
Plasma pressure: 45 Pa
time for a plasma treatment: 3 min.
Temperature of the plasma treatment: 55° C.
(3) The Third Process
Next, a zinc acetate film having a surface roughness placed in a plasma device was further practiced by a plasma oxidation process under the following condition, and was converted to a metal oxide film (zinc oxide) having a center line average surface roughness (Ra) of 85.8 nm.
RF electric power (frequency 13.56 MHz): 300 W
Plasma generation gas: $O_2$
Gas flow rate: 50 mL/min.
Plasma pressure: 45 Pa
time for a plasma treatment: 3 min.
Temperature of the plasma oxidation treatment: 55° C.
Subsequently, the PET substrate having such metal oxide film was washed by water at 25° C. for 30 minutes, and was evaluated in the same way as example 1 as the metal oxide film for example 14.

Example 15

In example 15, a metal oxide film (indium oxide) was formed and evaluated in the same way as example 14, except that indium (III) acetylacetonate (made by Aldrich company, purity 99.99%) was used as metal complex instead of zinc acetate. Table 1 shows the experimental results.

Example 16

In example 16, a metal oxide film (zinc oxide) was formed and evaluated in the same way as example 1, except that zinc chloride ($ZnCl_2$, made by Kanto Chemical Co., INC., high grade) was used as a metal salt and was dissolved in acetonitrile. Table 1 shows the experimental results.

Example 17

An ITO film of 100 nm in thickness was formed on the metal oxide film obtained in example 1 by a magnetron sputtering method using sputtering device (ISP-4000S-C, made by ULVAC, Inc). The sputtering condition was as follows. Table 1 shows the experimental results.
RF electric power: 500 W
Gas flow rate: Ar (100 mL/min.), $O_2$ (1 mL/min.)
Sputtering treatment time: 52 seconds
Note that an oxygen content measurement was omitted since the ITO film was formed on the surface.

Comparative Example 1

In comparative example 1, a metal oxide film (zinc oxide) was formed and evaluated in the same way as example 1, except that the second process as forming the surface irregularity to the metal salt film was eliminated. Table 1 shows the experimental results.

Comparative Example 2

In comparative example 2, an evaluation was carried out in the same way as example 1, except that the third process as an oxidation treatment to a metal salt film was eliminated. Table 1 shows the experimental results. Note that "—" in the table 1 means that the data was unmeasured.

TABLE 1

| | Shape of Roughness | Ra (nm) | Oxygen Content (mol %) | surface specific resistance (Ohm/□) | Light Transmittance (%) | Cross cut adhesion (classification) |
|---|---|---|---|---|---|---|
| Example 1 | mountain-shaped | 89.4 | 57.6 | $6.69 \times 10^6$ | 91.9 | 0 |
| Example 2 | mountain-shaped | 45.8 | 55.7 | $4.33 \times 10^6$ | 91.5 | 0 |
| Example 3 | mountain-shaped | 64.8 | 56.7 | $4.22 \times 10^6$ | 91.1 | 0 |
| Example 4 | mountain-shaped | 55.2 | 58.9 | $4.56 \times 10^6$ | 91.4 | 0 |
| Example 5 | mountain-shaped | 88.4 | 52.4 | $5.46 \times 10^6$ | 91.6 | 0 |
| Example 6 | mountain-shaped | 92.3 | 57 | $7.78 \times 10^4$ | 91.8 | 0 |
| Example 7 | mountain-shaped | 98.1 | 54.7 | $1.87 \times 10^4$ | 91.5 | 0 |
| Example 8 | mountain-shaped | 86.9 | 62.5 | $3.68 \times 10^5$ | 91.3 | 0 |
| Example 9 | mountain-shaped | 88.5 | 52.3 | $9.25 \times 10^3$ | 91.3 | 0 |
| Example 10 | mountain-shaped | 91.4 | 68.5 | Over $1 \times 10^{10}$ | 92.5 | 0 |
| Example 11 | mountain-shaped | 71.4 | 57.7 | $3.58 \times 10^6$ | 91.5 | 0 |
| Example 12 | brush shaped | 118.5 | 52.9 | $4.52 \times 10^6$ | 92.0 | 0 |
| Example 13 | brush shaped | 121.9 | 55.4 | $4.56 \times 10^5$ | 91.8 | 0 |
| Example 14 | mountain-shaped | 85.8 | 47.4 | $5.03 \times 10^7$ | 91.2 | 0 |
| Example 15 | mountain-shaped | 91.6 | 56.6 | $2.22 \times 10^7$ | 91.3 | 0 |
| Example 16 | mountain-shaped | 92.3 | 46.5 | $7.78 \times 10^4$ | 91.8 | 0 |
| Example 17 | mountain-shaped | 101.1 | — | $7.17 \times 10$ | 84.2 | 0 |
| Comparative example 1 | flat-shaped | 1.3 | 55.3 | $8.84 \times 10^4$ | 89.2 | 0 |
| Comparative example 2 | mountain-shaped | 89.4 | — | Over $1 \times 10^{10}$ | 91.1 | — |

As shown in table 1 an obtained film in examples 1 to 17 was mountain-shaped or brush shaped, that is, concave or convex shaped having surface roughness (Ra) was 45.6 to 121.9 nm. An oxygen content of the obtained metal oxide film was 46.5 to 68.5 mol %, and it was confirmed that a metal oxide film was formed.

The metal oxide film in examples from 1 to 9 and from 11 to 17 was also confirmed that it had a low surface specific resistance and a high light transmittance.

Also, it was confirmed that a metal oxide film was obtained in example 10 such that although its surface specific resistance was high owing to titanium oxide characteristics, its light transmittance was high.

Further, a metal oxide film in examples 1 to 17 showed excellent adhesion.

On the other hand, in comparative examples 1 where the second process to form a surface irregularity was eliminated, although the predetermined metal oxide film was obtained, the center line average roughness (Ra) of the metal oxide film was so small, compared to the metal oxide film in examples from 1 to 17, that a formed metal oxide film could not be used as an electrode having a surface irregularity.

Further, in comparative examples 2, although the predetermined metal salt film was obtained, the surface specific resistance was over 1×1010 and the formed metal salt film could not be used as an electrode.

Note that an adhesion evaluation could not be carried out because of insufficient coating film strength.

Example 18

In example 18, as shown in FIG. 21, a zinc oxide film (metal oxide film) was formed, except that a patterning process (a straight line pattern, a line width was 200 μm, space width was 200 μm) was carried out by a light-photolithography method before predetermined plasma etching treatment and evaluated based on example 14 (however, evaluations of surface specific resistance, light transmittance and adhesion were omitted).

As a result, it was confirmed that the film had a surface irregularity of mountain-shaped (Ra was 89 nm), and that a zinc oxide film whose oxygen content was 58 mol % and which had a line-shaped pattern, was formed.

Example 19

In example 19, as shown in FIG. 26, a zinc oxide film (metal oxide film) was formed and evaluated based on example 1 (however, evaluations of surface specific resistance, light transmittance and adhesion were omitted), except that a patterning process (a circular dot pattern, 200 μm in diameter, 1000 μm in center-to-center distance) was carried out by a ink jet method before predetermined plasma etching treatment.

As a result, it was confirmed that the film had a surface irregularity of mountain-shaped (Ra: 89 nm), and that a zinc oxide film whose oxygen content was 47 mol % and which had a dot-shaped pattern, was formed.

Example 20

In example 20, as shown in FIG. 16, a patterning process (a circular dot pattern, 100 μm in diameter, 500 μm in center-to-center distance) was carried out on a zinc acetate film (metal salt film) formed on predetermined glass substrates by a light-photolithography method. Subsequently, the zinc acetate film was practiced by thermal oxidation treatment (in the air, at 500° C., for 30 minutes) based on example 1, to convert the film into a zinc oxide film (metal oxide film), and was evaluated (however, evaluations of surface specific resistance, light transmittance and adhesion were omitted).

As a result, it was confirmed that the film had a flat surface (Ra was below 2 nm), and that a zinc oxide film whose oxygen content was between 45 and 70 mol % and which had a dot-shaped pattern was formed.

Example 21

In example 21, as shown in FIG. 18, a zinc acetate film was formed, which was patterned by a ink jet method on predetermined glass substrates (a circular dot pattern, 100 μm in diameter, 500 μm in center-to-center distance). Subsequently, the zinc acetate film was practiced by thermal oxidation treatment (in the air, at 500° C., for 30 minutes) based on example 1, to convert the film into a zinc oxide film (metal oxide film), and was evaluated (however, evaluations of surface specific resistance, light transmittance and adhesion were omitted).

As a result, it was confirmed that the film had a flat surface (Ra was below 2 nm), and that a zinc oxide film whose oxygen content was between 45 and 70 mol % and which had a dot-shaped pattern, was formed.

Example 22

In example 22, as shown in FIG. 20, a patterning process (a line pattern, a line width was 100 μm, space width was 100 μm) was carried out on a zinc acetate film (metal salt film) formed on predetermined glass substrates by a photolithography method, after a plasma partial oxidation treatment was carried out on a zinc acetate film (metal salt film) in the following condition. Subsequently, the film partial oxidized was practiced by thermal oxidation treatment (in the air, at 500° C., for 30 minutes) based on example 1, to convert the film into a zinc oxide film (metal oxide film), and was evaluated (however, evaluations of surface specific resistance, light transmittance and adhesion were omitted).

RF electric power (frequency 13.56 MHz): 300 W
Plasma generation gas: $O_2$
Gas flow rate: 50 mL/min.
Plasma pressure: 45 Pa
time for a plasma treatment: 1 min.
Temperature of the plasma oxidation treatment: 45° C.

As a result, it was confirmed that the film had a predetermined surface irregularity (Ra was over 10 nm), and that a zinc oxide film whose oxygen content was between 45 and 70 mol % and which had a line-shaped pattern, was formed.

INDUSTRIAL APPLICABILITY

As mentioned above, the method for forming a metal oxide film in the present invention provides an excellent surface specific resistance, a transparency, or the like, and also stably provides a metal oxide film having a predetermined surface irregularity and a predetermined conductivity, and the like, as well.

Also, since a metal oxide film in the present invention has an excellent surface specific resistance, transparency, and the like, and it has a predetermined surface irregularity, and the like, the present invention provides a metal oxide film which is most suitable for an electronic devices electrode.

Accordingly, the present invention efficiently provides a most favorable laminate as transparent electrode, and the like, for a liquid crystal display device, a plasma display device, an organic electro luminescence device, an inorganic electro luminescence device and the like.

The invention claimed is:

1. A method for forming a metal oxide film having both a surface irregularity and a predetermined pattern on a substrate,
   wherein the said method includes:
   (1) applying a liquid material containing at least one of a metal salt and a metal complex on a substrate to form a coated film;
   (2) forming both a surface irregularity and a predetermined pattern to the coated film by plasma etching treatment wherein at least one of a rare gas and a nitrogen gas is used as a plasma generation gas and wherein the surface irregularity has a center line average surface roughness (Ra) of 30 nm or more; and
   (3) carrying out a thermal oxidation treatment or plasma oxidation treatment under a condition of existence of oxygen source to the coated film which has both a surface irregularity and a predetermined pattern to convert a metal oxide film having both a surface irregularity and a predetermined pattern.

2. The method for forming a metal oxide film according to claim 1, wherein the step of applying a liquid material including at least one of a metal salt and a metal complex or comprises applying, a liquid material including a metal salt containing zinc or indium or a liquid material including a metal complex containing zinc or indium.

3. The method for forming a metal oxide film according to claim 1, wherein a temperature of the plasma treatment is set to be a value within 20 to 100° C. and plasma treatment pressure is set to be a value within 1 to 500 Pa.

4. The method for forming a metal oxide film according to claim 1, wherein the plasma oxidation treatment or the thermal oxidation treatment is carried out to oxidize the coated film partially.

5. The method for forming a metal oxide film according to claim 1, wherein a temperature of the thermal oxidation treatment is set to be a value within the range of 300 to 800° C. when the thermal oxidation treatment is carried out.

6. The method for forming a metal oxide film according to claim 1, wherein oxygen is used as plasma generation gas of the plasma oxidation treatment when the plasma oxidation treatment is carried out in the third process, and plasma pressure is set to be a value within $1.0 \times 10^3$ to $1.0 \times 10^2$ Pa, and a time for a plasma treatment is set to be a value within 10 to 600 seconds, and a temperature of the plasma oxidation treatment is set to be a value within 20 to 100° C.

7. The method for forming a metal oxide film according to claim 1, further comprising providing a metal film or another metal oxide film which is different from said metal oxide film on the metal oxide film.

8. A method for forming a metal oxide film having a surface irregularity on a substrate, wherein the method comprises:

(1) applying a liquid material containing at least one of a metal salt and a metal complex on a substrate to form a coated film;

(2) forming a surface irregularity to the coated film by plasma etching treatment, wherein at least one of a rare gas and a nitrogen gas is used as a plasma generation gas, the surface irregularity having a center line average surface roughness (Ra) of 30 nm or more; and (3) carrying out a thermal oxidation treatment or a plasma oxidation treatment under a condition of existence of an oxygen source to the coated film that has a surface irregularity to convert a metal oxide film having a surface irregularity.

9. The method for forming a metal oxide film according to claim 8, wherein the step of applying a liquid material including at least one of a metal salt and a metal complex comprises applying a liquid material that includes a metal salt containing zinc or indium or a liquid material including a metal complex containing zinc or indium.

10. The method for forming a metal oxide film according to claim 8, wherein a temperature of the plasma treatment is set to be a value within 20 to 100° C. and a plasma treatment pressure is set to be a value within 1 to 500 Pa.

11. The method for forming a metal oxide film according to claim 8, wherein the plasma oxidation treatment or the thermal oxidation treatment is carried out to oxidize the coated film partially.

12. The method for forming a metal oxide film according to claim 8, wherein a temperature of the thermal oxidation treatment is set to be a value within the range of 300 to 800° C. when the thermal oxidation treatment is carried out.

13. The method for forming a metal oxide film according to claim 8, wherein oxygen is used as plasma generation gas of the plasma oxidation treatment when the plasma oxidation treatment is carried out in the third process, and plasma pressure is set to be a value within $1.0 \times 10^{-3}$ to $1.0 \times 10^2$ Pa, and a time for a plasma treatment is set to be a value within 10 to 600 seconds, and a temperature of the plasma oxidation treatment is set to be a value within 20 to 100° C.

14. The method for forming a metal oxide film according to claim 8, further comprising providing a metal film or another metal oxide film that is different from the metal oxide film on the metal oxide film.

* * * * *